(12) United States Patent
Rathnam et al.

(10) Patent No.: US 10,594,868 B1
(45) Date of Patent: Mar. 17, 2020

(54) TECHNIQUES FOR RESPONDING TO INBOUND VOICE MESSAGES IN A COMMUNICATION SYSTEM

(71) Applicant: Republic Wireless, Inc., Raleigh, NC (US)

(72) Inventors: Sai Rathnam, Raleigh, NC (US); Justin Milam, Burgaw, NC (US); Ryan McShane, Raleigh, NC (US); Dean Thorson, Grayslake, IL (US); James Mulcahy, Raleigh, NC (US); Jared Kashimba, Micanopy, FL (US); Matthew Newton, Park Ridge, IL (US); Ibraheem Khalifa, Cary, NC (US); Steve Ims, Raleigh, NC (US)

(73) Assignee: Republic Wireless, Inc., Raleigh, NC (US)

(*) Notice: Subject to any disclaimer, the term of this patent is extended or adjusted under 35 U.S.C. 154(b) by 0 days.

(21) Appl. No.: 16/668,697

(22) Filed: Oct. 30, 2019

Related U.S. Application Data

(63) Continuation of application No. 16/519,419, filed on Jul. 23, 2019, now Pat. No. 10,523,818.

(51) Int. Cl.
  *H04M 3/533* (2006.01)
  *H04M 3/537* (2006.01)
  *H04W 4/12* (2009.01)
  *H04M 7/00* (2006.01)

(52) U.S. Cl.
  CPC ....... *H04M 3/53341* (2013.01); *H04M 3/537* (2013.01); *H04M 3/5335* (2013.01); *H04W 4/12* (2013.01); *H04M 7/006* (2013.01)

(58) Field of Classification Search
  CPC .................................. H04M 3/53341
  See application file for complete search history.

(56) References Cited

U.S. PATENT DOCUMENTS

| | | | | |
|---|---|---|---|---|
| 6,021,181 | A * | 2/2000 | Miner | H04M 3/436 379/88.02 |
| 2008/0285587 | A1* | 11/2008 | Balk | G06Q 10/107 370/466 |
| 2011/0183659 | A1* | 7/2011 | Ayyasamy | H04L 12/66 455/419 |

(Continued)

*Primary Examiner* — Jason E Mattis
(74) *Attorney, Agent, or Firm* — Gregory Stephens

(57) ABSTRACT

Techniques are disclosed for responding to a pre-recorded inbound voice message in a communication system that includes communication devices and a communication server. In a first communication device, a pre-recorded inbound voice message is received from a sender communication device via a communication server. A reply mode is set for a response voice message from a plurality of reply modes. The response voice message is recorded and a reply mode flag is inserted into a message header. The response voice message is then sent to the communication server where it determines the reply mode. When the reply mode is reply to all, the response voice message is sent to the sender communication device and other recipient communication devices. When the reply mode is reply to sender, a direct channel communication link is established between the first communication device and the sender communication device and the response voice message is sent directly to the sender communication device.

15 Claims, 26 Drawing Sheets

(56) References Cited

U.S. PATENT DOCUMENTS

2012/0209933 A1* 8/2012 Ridges .................. H04L 65/403
709/208
2017/0180282 A1* 6/2017 Caseau .................. H04L 51/24

* cited by examiner

100

100

400

500

700

900

1100

1500

1600

1700

1900

2000

2100

2200

2300

2400

2600

2800

TECHNIQUES FOR RESPONDING TO INBOUND VOICE MESSAGES IN A COMMUNICATION SYSTEM

CROSS-REFERENCE TO RELATED APPLICATIONS

The present application is a continuation of and claims priority to U.S. patent application Ser. No. 16/519,419 filed Jul. 23, 2019 entitled, "Techniques for Managing Inbound Voice Messages in a Communication System".

TECHNICAL FIELD

Examples described herein are generally related to techniques for providing a communication system and methods to communicate voice and data among a network of portable communication devices, many without display capabilities.

BACKGROUND

Many communication devices utilizing synchronous and asynchronous style voice and data communication over known wireless communication protocols such as 802.11 WiFi and cellular are available. The most ubiquitous device of all is the smartphone that combines inter-connected (e.g., the public switched telephone system—PSTN) voice telephony and wireless internet access on a handheld device that includes a touchscreen display as the primary user interface. While the smartphone is certainly a powerful and versatile personal communication device, it does not address or solve all communication needs. Many voice and data communication needs do not desire nor require a display to function.

For instance, the Relay® device by Republic Wireless® is a screenless disk-like handheld device that can enable voice communication with other Relay® devices similar to the way walkie-talkies communicate. There are a multitude of use cases for personal and/or enterprise wireless connectivity for which smartphones may not be the most practical or economical solution. Many times, a simpler less complicated and significantly less expensive device is all that is needed, especially in Internet of Things (IoT) applications. In another use case, many parents or employers wish to provide their kids or employees with reliable and robust communication but do not want to provide them with a screen and other wireless connectivity such as Internet access or social media access. Thus, screenless communication devices are a better fit.

Many of these communication devices utilize a wireless Internet Protocol (IP) communication link rather than a circuit switched communication link to exchange voice and data with a communication server. The communication server mediates voice messages and data among various endpoints. The communication device(s) may wirelessly connect to an IP network over one or more wireless IP interfaces and communication links.

The IP communication link may be 802.11 based such as WiFi or may be cellular based utilizing at least one of the many cellular IP air interfaces. There are several cellular IP air interfaces already in existence that use specific frequency ranges that are suitable for use with the embodiments described herein. It should be noted that the term 802.11 encompasses all of the 802.11 versions that currently exist and may be developed. Some cellular IP air interface examples include the General Packet Radio Service (GPRS), Enhanced Data for GSM Evolution (EDGE), Evolution-Data Optimized (EV-DO), High Speed Packet Access (HSPA), High Speed Downlink Packet Access (HSDPA), Long-Term Evolution (LTE), Voice-over Long-Term Evolution (VoLTE), Wideband Code Division Multiple Access (WCDMA), Universal Mobile Telecommunications System (UMTS), and High Rate Packet Data (HRPD). Moreover, there are many more wireless IP air interfaces in the planning and/or experimental stages (e.g., 5G, light-wave based, etc.) that use the same and/or different frequencies that would also be suitable for use with the embodiments described herein.

What is needed are techniques for easily and intuitively managing voice and data communication among such communication devices.

DETAILED DESCRIPTION

Figure 1A:
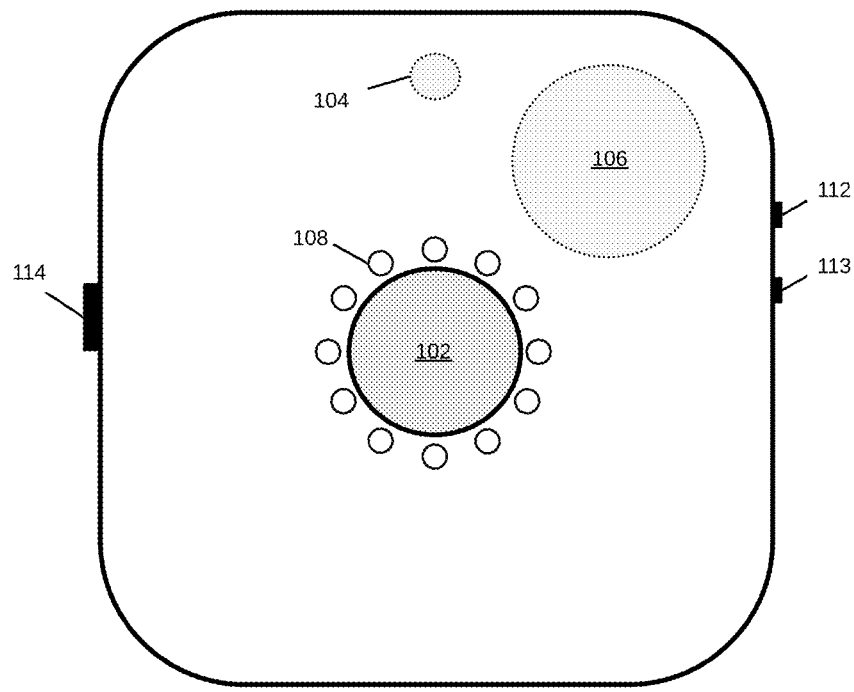
FIGS. 1A-1B illustrate a portable communication device according to an embodiment of the invention.

There are many communication devices and networks in use today catering to voice and data communications. The most common network for handling both voice and data is the Internet. The Internet exchanges data in a format known as IP or Internet Protocol. The Internet Protocol is essentially a set of rules governing the format of data sent over the Internet and other IP networks. Data may encompass a variety of consumable formats including text, images, audio, video, etc. Each of these types of data may be reduced to streams of data packets in the IP format.

While IP may be the format of the data exchanged, there may be multiple mechanisms for conveying the IP data. For instance, an ethernet cable is typically used to connect wired endpoints of an IP network. For many uses and applications, connecting a cable to an endpoint or device is highly impractical. For instance laptops, tablets, and mobile phones (including smartphones) generally rely on wireless connectivity. Thus, wireless technologies like 802.11 WiFi and cellular IP (e.g., LTE, 4G, 5G) have been created and are typically improved as each year passes. These wireless technologies enable portable computer or communication devices to have greater network connectivity via wireless access points and/or cellular basestations. Thus, endpoint devices of all types have many connectivity options for connecting to the Internet or "getting online" and exchanging IP data.

The most common endpoint devices needing Internet access or connectivity include the aforementioned laptop computers (and other computers), tablets, and mobile phones. Each of these devices typically include a screen for presenting visual displays of data. In addition, each device is highly flexible and capable of many functions. The mobile phone has the smallest physical footprint of those mentioned but may still be too cumbersome for some specific tasks or use cases.

More recently, a new type of 'connected' device has hit the market generally known as a smart speaker. Most smart speakers are screenless devices with the power and connectivity of a computer. Without a screen, the primary form of user interaction is voice recognition based. Most of these devices are not as portable as a mobile phone and do not typically include cellular connectivity—primarily due to the recurring monthly cost of using a cellular data network. So long as the smart speaker is within range of a WiFi network access point, Internet connectivity can be achieved.

Lately, new use cases have appeared that require cellular connectivity in a simplified device. In one example, parents would like to provide their younger children a simplified means of communication without providing all the other trappings and distractions of a full featured smartphone. In another example, many elderly people are unfamiliar with the complexities of using a smartphone and prefer a simplified user experience for communication. In still another example, many business enterprises seek a private closed communication device/network in which the device does not necessarily include a screen thereby driving the device cost down and keeping unnecessary distractions to a minimum. Thus, a new type of communication device has been developed that combines simplified communications with wide-area connectivity including WiFi and cellular.

In addition, the Internet of Things (IoT) promises to dramatically enhance device connectivity by embedding connectivity into non-traditional endpoints like thermostats, refrigerators, water meters, electric meters, other home appliances, etc. That does not even include non-residential use cases and endpoints. Thus, whole other types of connected devices are being developed. One possibility is to develop a proxy IoT device that contains all the local and wide area connectivity necessary to get connected to the Internet while also functioning like an access point to other endpoint devices that may only have low power/short distance connectivity like Bluetooth. In such a scenario, a single IoT proxy device could service multiple IoT endpoints without requiring those endpoints to provide their own expensive cellular connectivity means.

The embodiments described herein disclose systems, methods, and computer program products for providing voice and data communication among a variety of interconnected endpoints and network based servers. The architecture and devices described are flexible enough and robust enough to handle a wide variety of use cases.

The systems and methods of the invention may be embodied in and performed by network based communication server(s) and other related components (e.g., databases), and software instructions executed by some or all of such devices and components, as will be explained in detail below. The different types of networks contemplated herein include, for example, IP based cellular mobile networks, and IP data networks, such as the Internet or other IP-based networks, including wide area networks, local area networks, and combinations thereof that include wireless 802.11 and wireless IP cellular means of access over a wide ranging spectrum of bandwidth.

As used herein the terms "communication device" and "portable communication device" are meant to generally indicate a screenless end user physical device (e.g., endpoint) intended for, among other things, exchanging voice and data communication with other communication devices communication devices with screens, computer devices, or network endpoints over one or more intra- and inter-connected communication networks. A communication device may be equipped with multiple RF transceivers including an 802.11 WiFi transceiver, a cellular banded transceiver, Bluetooth transceiver, a LoRa® transceiver and near field communication (NFC) capability. Other similar RF transceivers configured to use various frequency ranges may also be implemented on the communication device as they are developed. For the sake of clarity, a communication device may encompass a computer device equipped with at least one RF radio or Ethernet connection. This includes, but is not necessarily limited to mobile phones, tablets, laptops, smartwatches, IoT devices, desktops, and other special purpose hardware such as, for instance, the aforementioned Relay® device by Republic Wireless®. Other examples may be understood to those of ordinary skill in the art.

Figure 5:
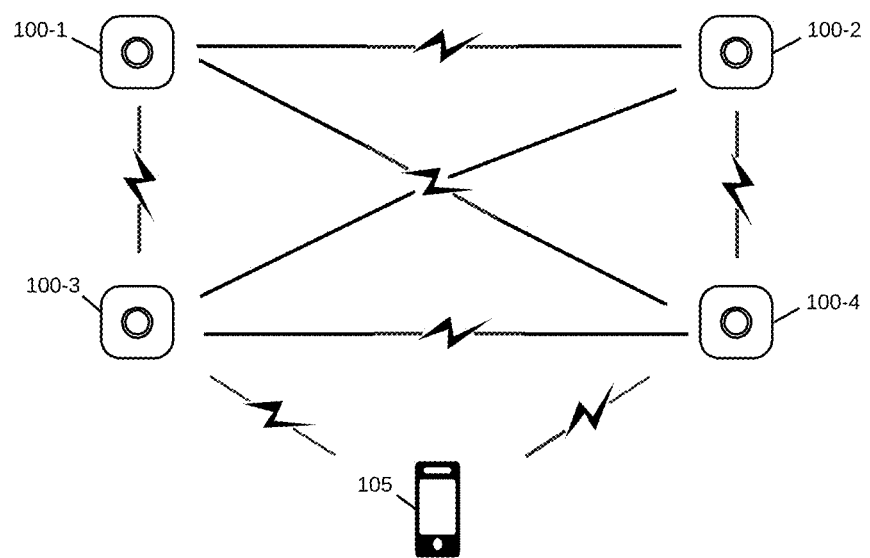
FIG. 5 illustrates a block diagram of multiple portable communication devices communicable with one another in a peer-to-peer mesh configuration according to an embodiment of the invention.

As used herein the term "voice communication" is meant to generally indicate synchronous or asynchronous exchange of voice data among two or more communication devices. Asynchronous, in this specification, refers to a mode of communication wherein communication devices operate in half-duplex mode meaning that the device does not transmit and receive over the same communication link simultaneously. Synchronous communication, in contrast, refers to full-duplex communication in which the parties/endpoints may send and receive at the same time. This is like a real-time telephone conversation. Full duplex communication does permit the parties to talk on top of one another. Most voice communication may be mediated by a communication server between the endpoints. Some voice communication may be peer-to-peer with one another or over a mesh network of other endpoints. This type of voice communication (as shown in FIG. 5) may not require a communication server to mediate.

As used herein the term "channel" is meant to generally indicate a logical connection, path, or link, among two or more communication devices allowing the private exchange of data including voice.

As used herein, the term "communication server" is intended to mean an IP based computer server that, among other capabilities, mediates and manages voice and data communications among communication devices over one or more inter-connected IP communication networks. In addition, the communication server may also maintain a database of subscribers or accounts, contact lists, and channels and those authorized to use them.

As used herein, the term "communication link" is intended to mean a physical and/or logical path that connects a communication device with the IP based communication server or with another communication device. A communication link may be a signaling link, a media link, or both. In this context, voice or data communication may be established via one or more communication links in which the IP based communication server is an endpoint for each of the communication links. The IP based communication server may then join one or more communication links together to establish a channel between or among two or more communication devices. The IP based communication server may be hosted within an IP network accessible to the Internet. In the case of a peer-to-peer connection, a communication link may be between two communication devices without a communication server between them. A peer-to-peer connection may also be achieved via a mesh in which one or more intervening communication devices may serve as relays or hops between the sending and receiving endpoints.

FIG. 1A illustrates a portable communication device 100 according to an embodiment of the invention. In this example, the communication device 100 is screenless and includes a single input button 102 that when pressed and held puts the communication device 100 into transmit mode. A microphone 104 (or array of microphones) picks up audio (e.g., speech) and a speaker 106 produces sound based on, among other things, received transmissions. An ring of light emitting diodes (LEDs) 108 may surround input button 102 and provides visual indicators for certain modes of operation and data. The ring of LEDs 108 may produce light in multiple colors and intensities. In addition, a pair of buttons 112, 113 are located on one side of the communication device 100 while another button 114 may be located on the other side of the communication device 100 and each may be assigned to perform various functions including, but not limited to, power on/off, volume up/down, channel switching, etc. The number and arrangement of buttons on the communication device 100 may be altered without changing the overall functionality of the communication device 100.

Figure 1B:
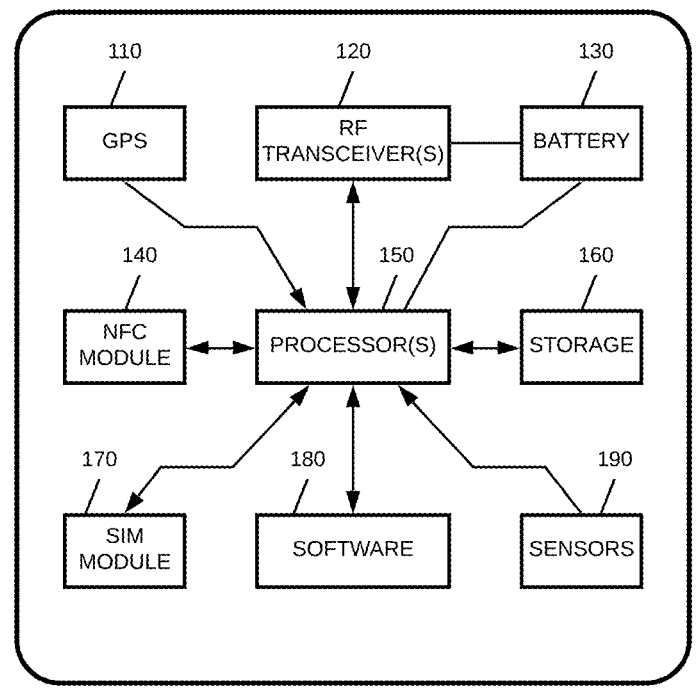

FIG. 1B illustrates the portable communication device 100 from an internal component point of view according to an embodiment of the invention. The communication device 100 may include one or more processors 150 for executing instructions, processing data, and controlling the functions of the communication device 100. A sensor input component 190 may receive and send signals and/or data between the processor(s) 150 and the various user input/output components such as the microphone 104, speaker 106, LED 108, and buttons 112, 113, 114. A generalized software component 180 includes computer code for controlling and executing the various functions of the communications device 100. The software component 180 may also represent downloaded or pre-loaded software applications. The software component 180 may be stored in storage component 160 which may include random access memory (RAM), Read-only memory (ROM), and/or removable storage media. The storage component 160 may also encompass mechanisms like subscriber identity module (SIM) 170 adapted to receive and interface with removable or embedded SIM cards or e-SIMS (not shown). The communication device 100 may be powered by a power source such as, for instance, a battery 130 that drives the components needing power like the processor(s) 150 and RF transceivers 120, and NFC module 140. The RF transceivers 120 may be embedded into chip sets for cellular communication, 802.11 WiFi communication, LoRa® and Bluetooth communication. The NFC module 140 may provide a data exchange capability between two communication devices 100 for various purposes including the ability to exchange general identification information and other data. A global positioning system (GPS) module 110 may also be included to provide location data that may be integrated into location based services provided by the communication device 100 in conjunction with a communication server.

Figure 2:
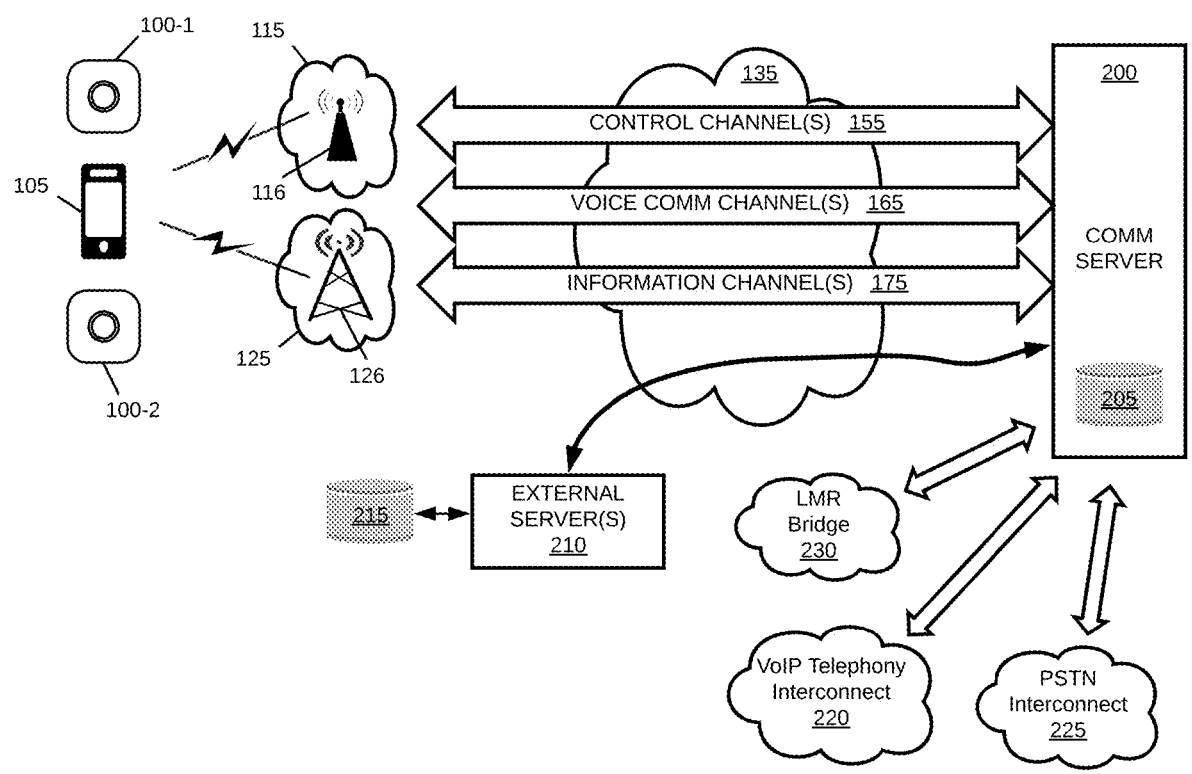
FIG. 2 illustrates a system architecture according to an embodiment of the invention.

FIG. 2 illustrates a system architecture according to an embodiment of the invention. The networked environment may include multiple distinct intra- and inter-connected networks such as, for instance, a large scale internet protocol (IP) network (e.g., the Internet) 135, one or more IP based local area networks or wide area networks (LANs/WANs) 115 accessible via 802.11 wireless access point(s) 116, and one or more mobile radio access networks (MRANs) 125 accessible via a cellular basestation tower(s) 126.

It should be noted that alternative wireless IP based networks (not shown) that do not operate over the frequency spectrum typically associated with 802.11 (e.g., WiFi) or cellular may be implemented. One example of such an alternate wireless IP network may be WiMAX (e.g., 802.16). Other examples may include, but are not limited to, networks utilizing television whitespace frequencies and other unlicensed (or yet to be licensed) frequencies, including, but not limited to, those under consideration for 5G implementations. These may include wireless networks operating within a frequency range of 100 MHz and 700 MHz, and wireless networks operating within a frequency range of 3.5 GHz and 3.7 GHz, and anything at or above 5 GHz including light-wave based transmission systems.

The MRANs 125 and the LANs 115 each have backhaul IP connectivity to the Internet 135 that provide connectivity with a communication server 200. In certain embodiments, MRANs 125 include cellular networks or portions of cellular networks based on a variety of circuit switched and/or IP data protocols such as, but not limited to, Global System for Mobile Communications (GSM), Code Division Multiple Access (CDMA), General Packet Radio Service (GPRS), Enhanced Data for GSM Evolution (EDGE), Evolution-Data Optimized (EV-DO), High Speed Packet Data (HSPD), High Speed Downlink Packet Access (HSDPA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD) and/or any other existing or developed/developing cellular network IP standards—e.g., 5G.

In addition to circuit switched radio transmission schemes, each MRAN 125 may also provide communication devices 100-1, 100-2, 105 with wireless IP based data access to the Internet 135 using one of the aforementioned cellular IP protocols. For illustration only, three (3) communication devices 100-1, 100-2, 105 have been illustrated. Communication devices 100-1, 100-2 may represent screenless communication devices like those illustrated in FIG. 1 while communication device 105 may represent a smartphone, for example. The architecture of FIG. 2 and the broader description herein may support any number of communication devices 100-1, 100-2, 105. Similarly, an IP access point 116 may provide wireless connectivity for communication devices 100-1, 100-2, 105 to the Internet 135 using any of the 802.11 WiFi standards and/or any other type of IP based connectivity standard.

In operation, communication device(s) 100-1, 100-2, 105 may establish a connection with and register with the communication server 200. The connection may comprise one or more communication links utilizing LAN 115 or MRAN 125. Once established, the communication device(s) 100-1, 100-2, 105 may exchange data, including voice communications, with the communication server 200. Communication server 200 may manage a plurality of communication device(s) 100-1, 100-2, 105 and includes, among other things, the capability to establish and manage private communication channels between and among multiple communication devices 100-1, 100-2, 105 such that communication channels may be created, used, amended, and deleted between or among two or more communication devices. A communication channel may be synchronous or asynchronous depending on the intended function of the channel.

In addition to private communication channels among multiple communication devices 100-1, 100-2, 105, the system may be configured for other types of communication and features. For instance, each communication device may create, join, or subscribe to a multitude of channels in which the function or purpose of each channel may be different. Broadly speaking, there may be control channels 155, voice communication channels 165, and information channels 175. Control channels 155 may be characterized as channels that convey non-content based data such as, for instance, commands, instructions, signaling data, sensor data (e.g., GPS) etc. Voice communication channels 165 may be characterized as channels that carry voice communication content or voice messages among two or more communication devices including smartphones, computers or tablets running an application based version of the purpose built communication device. Information channels 175 may be characterized as channels that exchange informational content between the communication devices 100 and the communication server 200. One example of an information channel 175 may include a voice recognition assistant similar to Amazon's Alexa™, Apple's Siri™ Microsoft's Cortana™, or Google's OK Google™. Another example of an information channel 175 may be a channel that provides specific communication device information such as current location, battery remaining, network connectivity, etc.

The communication server 200 may also include or have access to a database 205. Database 205 may contain information on all of the communication devices 100-1, 100-2, 105 managed by the communication server 200 as well as all the channels those communication devices 100-1, 100-2, 105 may use. The communication devices 100-1, 100-2, 105 may be organized into accounts as will be described later. In addition, the communication server 200 may also have access to one or more external servers 210 and any associated databases 215 for purposes of retrieving information not contained within the communication server 200 or database 205 or to exchange messages or data with external sources on behalf of the communication devices 100-1, 100-2, 105.

The communication server 200 may also include telephony interfaces to one or more Voice-over Internet Protocol (VoIP) networks 220, the Public Switched Telephone Network (PSTN) 225, and land-mobile radio (LMR) network(s) 230.

Figure 3:
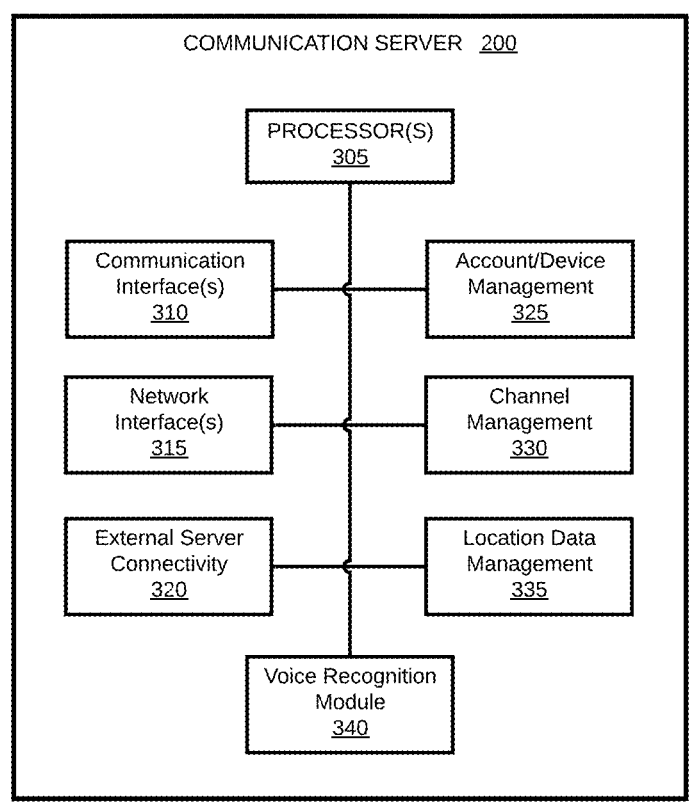
FIG. 3 illustrates a block diagram of a communication server according to an embodiment of the invention.

FIG. 3 illustrates a block diagram 300 of a communication server 200 according to an embodiment of the invention. The communication server 200 may include one or more processor(s) 305 configured to execute the other components, modules, interfaces, and software of the communication server 200. The communication server 200 may include hardware, firmware, and software that collectively functions as one or more communication interfaces 310. The communication interfaces 310 may include telecommunication interfaces to the Public Switched Telephone System (PSTN), one or more Voice-over Internet Protocol (VoIP) telephony systems, and one or more Land-Mobile Radio (LRM) systems. Through such communication interfaces 310, a communication device 100 like that described in FIGS. 1-2 may communicate with a telephony endpoint on the other side of the PSTN, a VoIP network, or an LMR bridge. Communication server 200 may also include one or more IP network interfaces for exchanging data and communicating over the Internet or a local are IP network (LAN).

In many applications, communication server 200 may need to exchange data with other external servers 210 to achieve a desired result or fulfill a specific request from one of the communication devices 100. In such cases, the communication server 200 may include external server connectivity 320 capable of accessing other networked servers 210 and databases 215.

Communication server 200 may include an account/device management module 325 whose function is to organize and manage communication devices 100. Typically, one or more communication devices 100 may be grouped under a single account. Each account may be individually managed to allow for a variety of intra-account communications and functions. In addition, the account/device management module 325 may permit communication devices from different accounts to communicate with one another on an inter-account basis once certain conditions are met. The account/device structure is more fully described with reference to FIG. 4 below.

A channel management module 330 may be responsible for creating and managing the various channels between and among communication devices 100 on an intra- and inter-account basis. This includes the control channels, voice communication channels, and information channels described in FIG. 2. For instance, the channel management module 330 can set up a voice channel between two specific communication devices 100. Once set up, the channel management module 330 can add other communication devices to the channel, remove communication devices from the channel, or delete the channel entirely. Other channel use cases may be described below with reference to other figures herein.

Another module within communication server 200 is the location data management module 335. The communication devices 100 managed by the communication server 200 may be equipped with Global Positioning System (GPS) chips and perhaps other location determination means. Many use cases call for the communication devices to report their location to the communication server 200. For instance, a master account device like a smartphone, tablet, or computer may be able to map the location of its associated communication devices. This would allow, for instance, a parent to plot exactly where their child is if they are in possession of a compatible communication device 100. There are many other use cases that involve location data and tracking that are described below.

Still another module within communication server 200 is the voice recognition module 340. Many of the communication devices 100 managed by the communication server 200 are screenless. Screenless devices have user interfaces that can be more reliant on voice interaction and recognition. Thus, the communication server 200 may be equipped with the voice recognition module 340 to enable certain features within the communication platform as a whole. For instance, combining voice recognition with an information channel may allow a user to pose verbal queries using the communication device. The verbal queries may be recognized and interpreted by the voice recognition module 340 and acted upon accordingly. It can be something as simple as asking, on a specific channel, "How many inches in a foot?" and receiving back an automated verbal response of 12. In another example, a user may pose the query, "How much battery do I have left?" The voice recognition module 340 may then parse the query and consult the account/device management module 325 to obtain the answer. Once the answer is obtained, communication server 200 may respond back to the requesting communication device with an answer like "You have 37% of your battery remaining." The examples above are illustrative not limiting.

Using the architecture of FIG. 2 and the capabilities of communication server 200 described in FIG. 3, a near limitless array of use cases may be conceived for highly robust and customized communication solutions.

Figure 4:
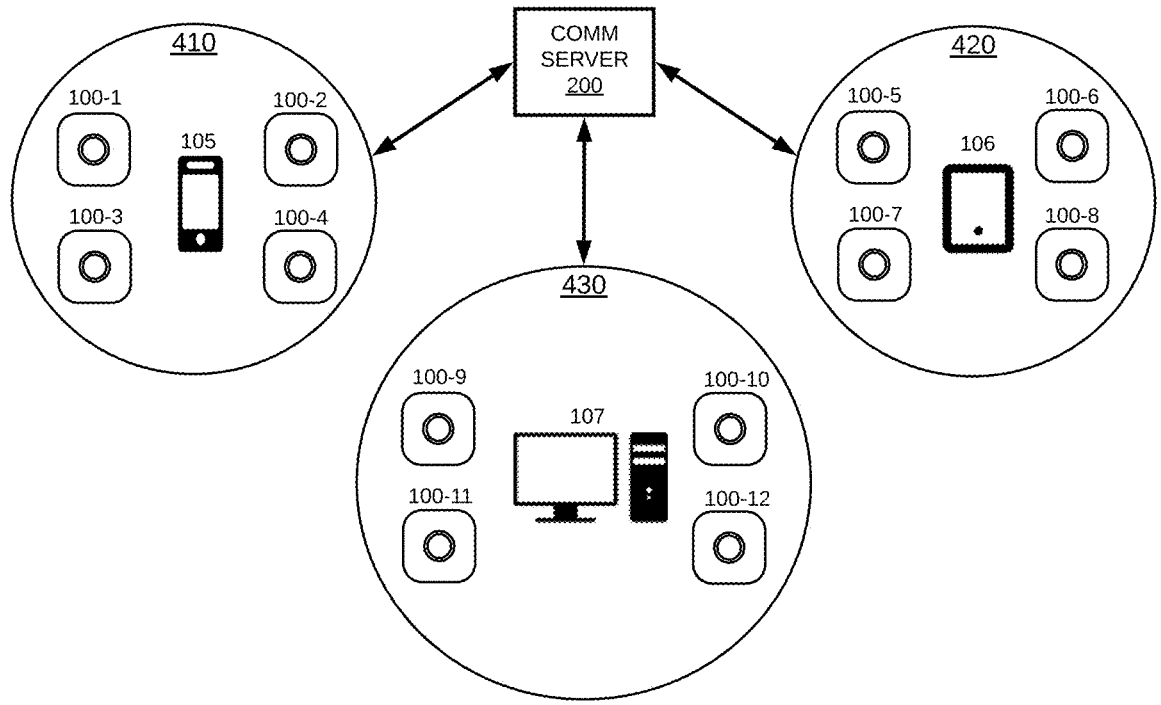
FIG. 4 illustrates an example of multiple portable communication devices grouped by accounts according to an embodiment of the invention.

FIG. 4 illustrates multiple communication devices 100 grouped together under a single account administered by a communication server 200 according to an embodiment of the invention. In this embodiment, three separate accounts 410, 420, 430 are illustrated. Account 410 includes four portable screenless communication devices 100-1, 100-2, 100-3, 100-4 and a smartphone 105 configured with an application to assist in managing the communication devices 100-1, 100-2, 100-3, 100-4 in account 410. Account 420 includes four portable screenless communication devices 100-5, 100-6, 100-7, 100-8 and a tablet 106 configured with an application to assist in managing the communication devices 100-5, 100-6, 100-7, 100-8 in account 420. Account 430 includes four portable screenless communication devices 100-9, 100-10, 100-11, 100-12 and a computer 107 configured with an application to assist in managing the communication devices 100-9, 100-10, 100-11, 100-12 in account 430.

In each account, the communication devices 100 may be linked together and controlled or managed by the smartphone 105, tablet 106, or computer 107. For instance, the smartphone 105 in account 410 may be running an application configured to identify, display, and manage many functions and features of each of its constituent communication devices 100-1, 100-2, 100-3, 100-4. Similarly, the tablet 106 in account 420 may be running an application configured to identify, display, and manage many functions and features of each of its constituent communication devices 100-5, 100-6, 100-7, 100-8. Likewise, the computer 107 in account 430 may be running an application configure to identify, display, and manage many functions and features of each of its constituent communication devices 100-9, 100-10, 100-11, 100-12. While the smartphone 105, tablet 106, and computer 107 are different devices, the software companion applications that manage and control their respective constituent communication devices 100 may be very similar.

The primary purpose of the companion application is to provide the account owner a more robust interface or dashboard for controlling and managing the screenless communication devices 100. Because the communication devices are screenless, it can be difficult to program them directly due to a lack of input feedback. Thus, the companion application can act as a proxy to control settings and other functions on behalf of the communication device(s) 100.

In one embodiment multiple communication devices 100 may be linked to a master account. The master account may be accessed through a companion application executing on one of the aforementioned smartphone 105, tablet 106, and computer 107 devices. Every new communication device 100 may then be activated under an existing account. To create an account, the companion application must be downloaded from cloud based platform like the Apple's app store for Apple ios devices, the Google Play Store for android devices, or from the provider's website, etc. to a computer device. A user may then open the companion application and create a new account if not already created. The user may be prompted for their name, an email address, a password, a phone number, and billing information. Once the requisite information has been gathered, the new master account is created.

To activate a new communication device under the master account, the user first powers it up. Provided the new device has some form of a network connection (e.g., WiFi or cellular), it can be configured to automatically connect to the communication server 200. For instance, the communication device may be pre-programmed with instructions how to connect to the communication server 200 upon establishing a network connection. In one embodiment, once connected, the communication device 100 may press its main button 102 three times quickly to send data over a control channel 155 which may be interpreted by the communication server 200 as a request for a temporary activation code. The activation code may be a random six (6) character alphanumeric string (e.g., 5657T8). Using the control channel 155, the communication server may send this code back to the communication device 100 where it may be audibly output. The user may then enter the activation code into an input prompt within the companion application where it may be verified with the communication server 200. If verified, that communication device is now linked to that companion application. Once linked, the companion application may program or set various settings and features for that communication device 100 over control channel 155. It should be noted that the specifics of the activation process may be altered without affecting its overall functionality. For instance, the activation code need not be six (6) characters but could be more or less and may include other characters. Similarly, the user may press the main button 102 four times rather than three to request an activation code. There may be many different combinations of button presses and activation codes.

The user may repeat the activation process to add additional communication devices 100 to the master account. The companion application may also provide means for removing or deleting communication devices 100 from the master account. The account data including the identities of the communication devices 100 and companion application devices associated with the master account may be stored and maintained within the account/device management module 325 of the communication server 200.

One of the primary functions of the companion application is to create and manage the various channels available on the platform. As described earlier (FIG. 2), there may be control 155, voice communication 165, and information 175 channels available on the platform. The voice communication channels 165 allow each communication device 100 to send voice messages to other communication devices 100 on a one-to-one, one-to-many, or many-to-one basis depending on how a particular voice communication channel 165 has been configured.

In addition, the voice communication channels 165 may be configured to allow intra-account or inter-account communication. Intra-account voice communication channels 165 may only allow voice communication between or among communication devices 100 that are all registered or configured under the same master account (e.g., 410). For example, communication devices 100-1, 100-2, 100-3, 100-4 and companion application device 105 under master account 410 may be configured for intra-account voice communication channels 165. Intra-account voice communication channels 165 may be set up from a single companion application (e.g., via smartphone device 105) because it controls all the communication devices 100 affected.

In one example, to create an intra-account voice communication channel 165, a user opens the companion application running on smartphone 105. The user may then select an option to create a new voice communication channel 165. The companion application may then prompt the user whether the voice communication channel will be a direct chat channel (e.g., between 2 communication devices) or a group chat channel (e.g., among 3 or more communication devices). The user may be prompted to create a name for the channel. The user may then be presented with a list of eligible communication devices and prompted to select which communication devices are to be added to the voice communication channel 165. Upon selection, the information is uploaded to the communication server 200 and the channel management module 330 creates and enables the channel thereby allowing the selected devices to exchange voice communication messages. The new voice communication channel may now be shown on one of the display screens controlled by the companion application. In addition, each communication device 100 included on the channel will be able to access it by name.

In another embodiment, creating a new voice communication channel 165 may be instigated from one of the communication devices. The user may switch their communication device 100-1 into a control channel 155 that is voice recognition enabled. The user may then hold the main button 102 and speak a command such as, for instance, "Create new voice channel". This command may be forwarded to the communication server 200 and parsed by the voice recognition module 340. The communication server may then respond back with a prompt asking the user to give the new channel a name. The user may then hold the main button 102 and speak a name for the voice channel which may be forwarded to the communication server 200 and applied to the new voice channel. The communication server 200 may then prompt the user for the names of the other communication devices 100-2, 105, 100-6 to add to the new voice channel. The user may hold the main button 102 and speak the name(s) of other communication devices 100-2, 105, 100-6 to add to the new voice channel. These names may be forwarded to the communication server 200 and parsed by voice recognition module 340. Communication server 200 may then automatically join any communication devices 100-2, 105 that are under the same master account 410 as the instigating communication device 100-1 and update the companion application associated with the master account 410 to reflect the new voice channel and its members.

In the example above, one of the specified communication devices 100-6 is under the control of a different master account 420. In this scenario, the communication server 200 will craft and send an invitation to join the new voice channel to the companion application of the master account 420 for the invited communication device 106. The invitation may include the name of the new channel and a list of the communication devices 100-2, 105, 100-6 that have been The master account owner may then access the companion application via tablet 106 and accept or reject the new voice channel invitation on behalf of communication device 106 at their discretion. If the new voice channel invitation is accepted, the companion application associated with the master account 420 may be updated to reflect the new voice channel and its members.

Inter-account voice communication channels 165 may allow voice communication between or among communication devices 100 that span multiple master accounts (e.g., 410, 420, 430). For example, communication devices 100-1, 100-2, and companion application device 105 under master account 410 may be configured for inter-account voice communication with communication devices 100-7, 100-8, and companion application device 106 under master account 420. Inter-account voice communication channels 165 may need to be set up from multiple companion applications (e.g., via smartphone device 105 and tablet 106 in this example) because each controls different communication devices 100 in the voice communication channel 165.

To create an inter-account voice communication channel 165, invitations from a companion application for one master account 410 may be sent to the companion application for another master account 420. For example, a companion application may reside on a device (e.g., smartphone 105) that is capable of email, text messaging, or other messaging (e.g., Instagram, WhatsApp, etc.). A user may compose a new voice channel invitation for communication devices 100-1, 100-2, 100-7, 100-8 within the companion application for master account 410 that may include the name of the new voice channel and a link to join. The invitation may be sent via one of the aforementioned email, text messaging, or other messaging system from smartphone 105 to the device (e.g., tablet 106) executing another companion application for master account 420. The recipient may receive the invitation in the messaging app used by the sender or email address used by the sender. The user may then click on the link in the invitation to join the new voice channel. Clicking the link may then open the companion application on tablet 106 with the option to accept or reject the invitation on behalf of communication device(s) 100-7, 100-8 invited at their discretion. If the new voice channel invitation is accepted, the companion application associated with the master account 420 may be updated to reflect the new voice channel and its members. Users of the communication devices 100-1, 100-2, 100-7, 100-8 may begin communicating with one another over the new voice channel.

In addition to the invitation processes described above, control channel(s) 155 may be implemented for other types of data exchanges between communication device(s) 100 and communication server 200. Some of the control channel data that may be exchanged includes GPS tracking data, signal level data, network connectivity data, and battery monitoring data.

For example, a communication device's 100 location may be periodically determined by the GPS module 110 and uploaded over a control channel 155 to the communication server 200 where it may be made available to the companion application for the master account linked to that communication device 100.

In another example, a companion application may monitor the status of its associated communication devices 100. Some of the status indicators may include battery level, volume level, registration or connectivity status, and channel status. The communication server 200 may periodically communicate with every connected communication device 100 over a control channel 155 to send and or receive data or instructions. The data and/or instructions may be exchanged with a respective companion application to give an account owner relevant data regarding the associated communication devices 100. For instance, a companion application may be configured to display one or more of the connectivity status (e.g., on/off net or cellular vs. WiFi connectivity), the percentage battery level remaining, the current channel tuned to, the signal strength, and the current location of each communication device 100 manageable by the companion application.

Moreover, the companion application may be configured to remotely control one or more of the status parameters on any communication device 100 it manages. For instance, a companion application may wish to send an urgent message to one or more communication devices 100. Prior to sending the actual message, the companion application may send an instruction over a control channel 155 to change to a particular channel and raise the volume level for each communication device 100. Then, when the message is sent by either the companion application user interface or one of the communication devices 100 in that channel, it will be heard by the intended recipient communication devices 100 as they will already be tuned to receive that channel.

Control channel(s) 155 may also be used to configure communication devices 100 remotely to create new channels and receive notifications among other things.

Information channels 175 may be characterized as channels that provide content to the communication device 100. There may be a near limitless number of information channels 175. For instance, there could be a weather based information channel that, when queried, provides a weather forecast to the communication device 100. A weather information channel may be configured through the companion application or by voice recognition on the communication device 100 itself. The weather based channel may need a geographic indication which may be something persistent like a zip code or more dynamic like GPS coordinates. The weather forecast may be derived from a third party server/service apart from the communication server 200. In operation, a communication device 100 may have a zip code linked to its weather channel such that when the user queries the communication device 100 for an update while tuned to the weather channel, the query is relayed to the communication server 200 where it is forwarded to the third party server. The third party server collects the relevant weather data for the desired zip code and returns it to communication server 200 where it is prepared and returned to communication device 100.

Other information channels 175 pertaining to topics such as traffic, sports scores, stock alerts, headline news, etc. may be similarly configured to provide the desired information.

FIG. 5 illustrates a block diagram 500 of multiple portable communication devices 100-1, 100-2, 100-3, 100-4, 105 in communication with one another in a peer-to-peer mesh configuration according to an embodiment of the invention. The communication devices 100-1, 100-2, 100-3, 100-4, 105 may implement a radio frequency protocol to communicate directly with one another without having to connect to a cellular basestation or other network access point that is communicable with communication server 200. One such radio frequency protocol may be LoRa which stands for "long range" and is a proprietary spread spectrum modulation technique that enables point to point communication between communication devices. In addition, each LoRa equipped communication device 100-1, 100-2, 100-3, 100-4, 105 may be further configured for mesh communications. A mesh system permits communication device 100-1 to communicate with communication device 100-4 even if it does not have a direct link to communication device 100-4. So long as communication device 100-1 can communicate with another communication device (e.g., 100-2 or 100-3) that itself can communicate with communication device 100-4, communication devices 100-1 and 100-4 may communicate with each other using the other communication devices as relays or hops along the way.

Peer-to-peer (with or without mesh) allow communication devices to communicate directly with one another without the assistance of communication server 200. This may sometimes prove useful when two or more communication devices are outside the range of any traditional network connectivity.

Figure 6:
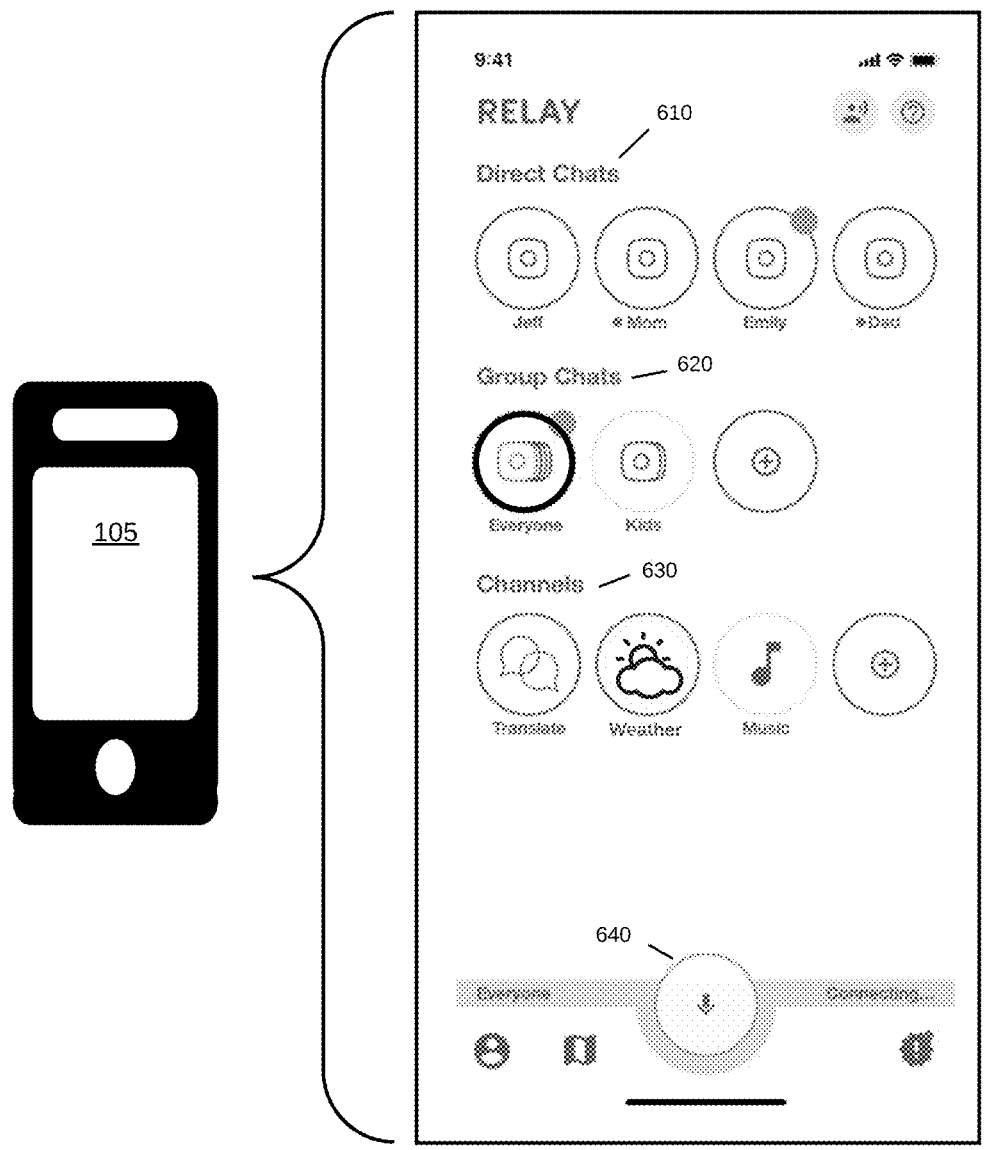
FIG. 6 illustrates an example of a user interface on a mobile communication device according to an embodiment of the invention.
Figure 7:
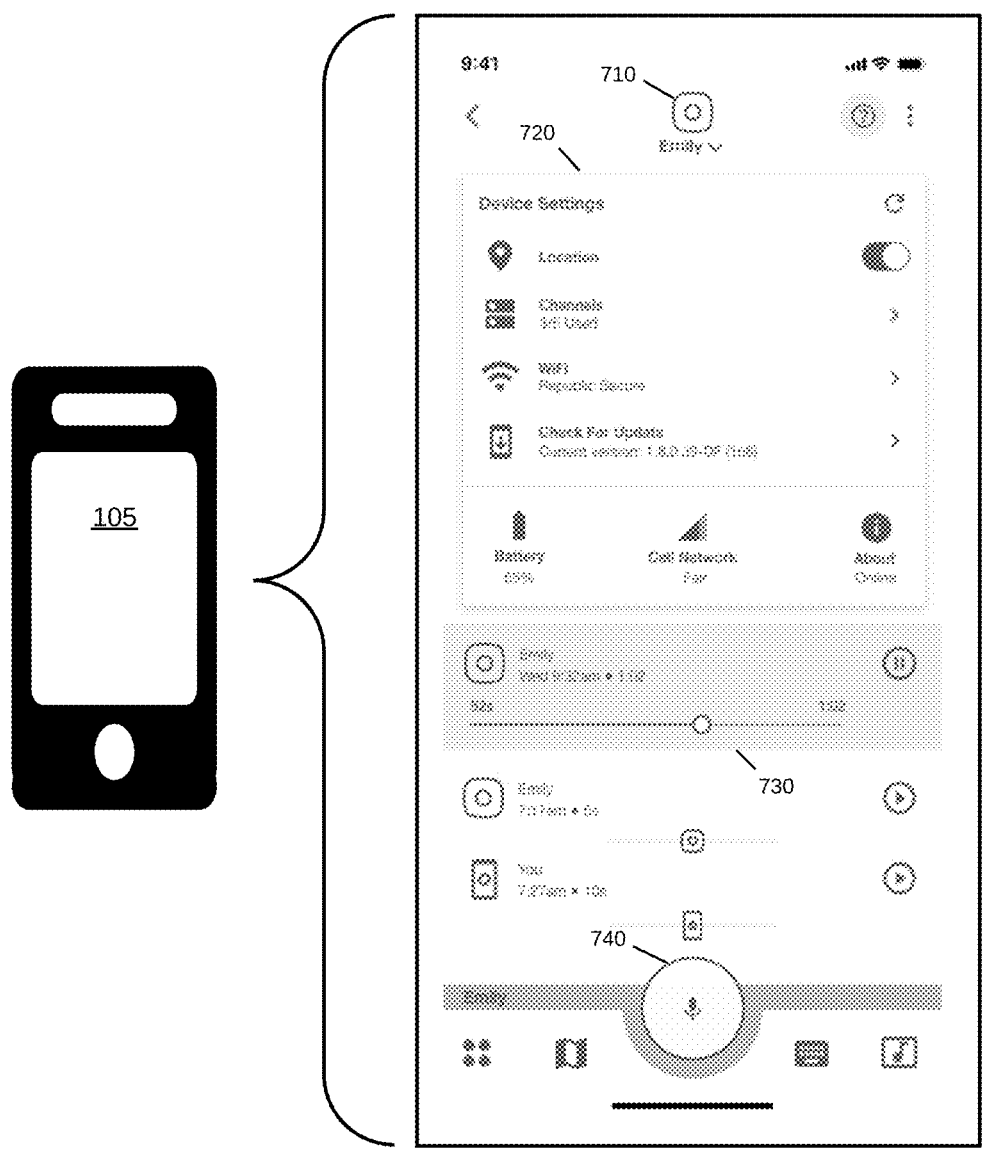
FIG. 7 illustrates an example of another user interface on a mobile communication device according to an embodiment of the invention.
Figure 8:
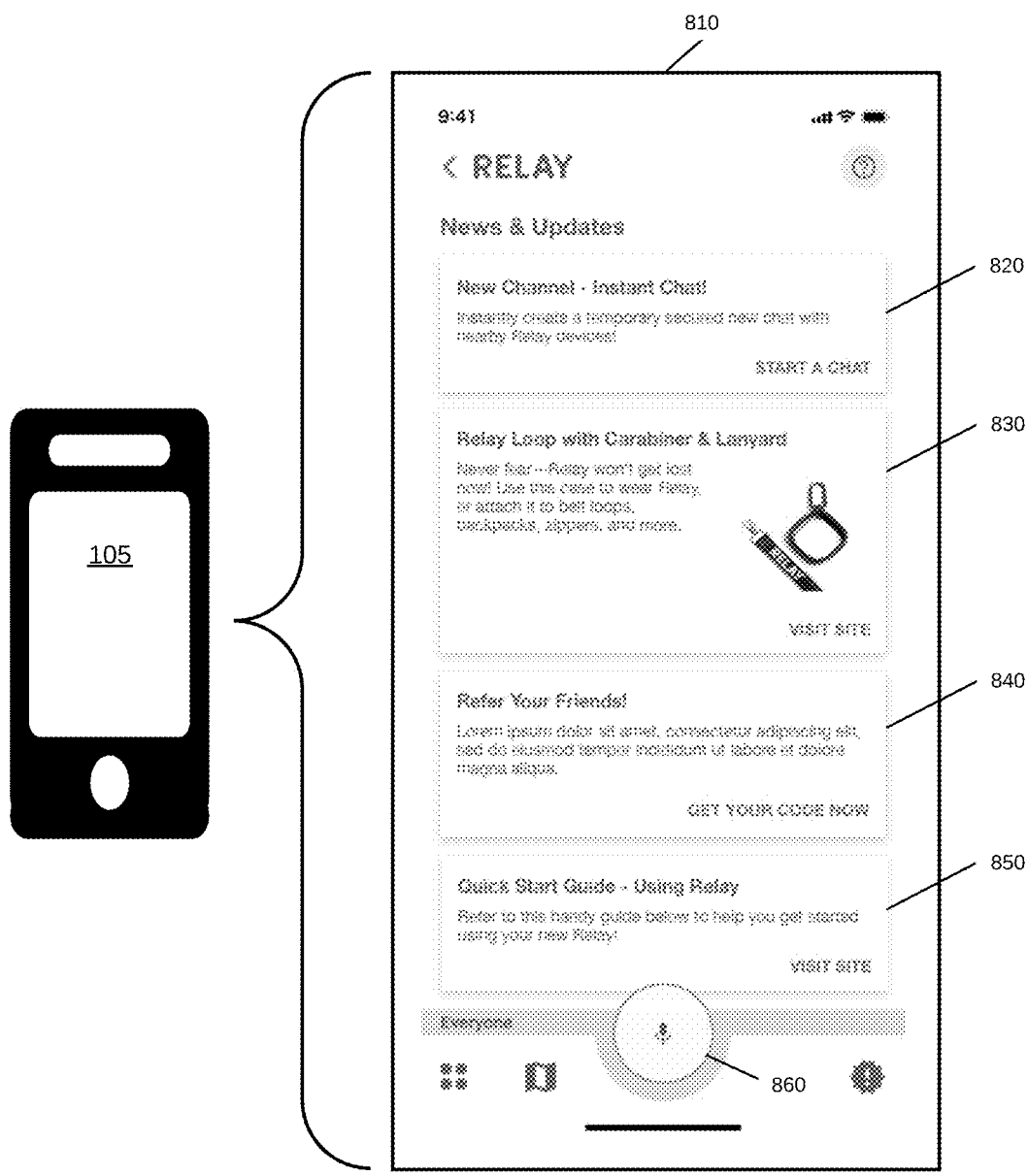
FIG. 8 illustrates an example of another user interface on a mobile communication device according to an embodiment of the invention.

FIGS. 6-8 illustrate examples of companion application user interfaces according to embodiments of the invention.

FIG. 6 illustrates an example showing how a user, via the companion application running on a smartphone 105, can see and manage the channels associated with multiple communication devices 100 under a single account. In this example, there are rows for direct chat communication channels 610, group chat communication channels 620, and a row 630 of informational channels 175.

The direct chat communication channels row 610 illustrates one or more communication devices 100 that the companion application has set up a direct chat channel with. It should be noted that the direct chat communication devices may be under the account managed by this companion application (intra-account direct chat) or under an account managed by a different companion application (inter-account direct chat). In this example, the companion application can directly chat on a one to one basis with the individual communication devices that have been named "Jeff", "Mom", "Emily", and "Dad".

Similarly, the group chat communication channels row 620 illustrates one or more groups of communication devices 100 that the companion application has set up a group chat channel with. It should be noted that the group chat communication devices may include communication devices under the account managed by this companion application (intra-account direct chat) or under an account managed by a different companion application (inter-account direct chat). In this example, the companion application can group chat with multiple communication devices that have been formed under the group names of "Everyone" and "Kids". Also shown on the far right of row 620 is an 'add' icon that initiates the creation of a new group chat channel when selected.

The "Everyone" group chat icon is bolded to visually indicate the channel to which the companion application is currently set. This is confirmed by the label just to the left of the microphone/button icon 640 that reads "Everyone". The microphone/button icon 640 is touch sensitive so that pressing and maintaining contact to that area of the display will activate the microphone of the smartphone 105.

The channels row 630 presents icons for each information channel 175 the companion application can access. In this example, there is a "Translate" channel that allows the user to speak into smartphone 105 in one language and receive back what was spoken in another language. There is also a "Weather" channel that may operate as described above. There is also a "Music" channel that may be able to access a repository of locally stored audio music files or stream music from communication server 200. Also shown on the far right of row 630 is an 'add' icon that initiates the creation of a new information channel when selected.

FIG. 7 illustrates an example showing how a user, via the companion application running on a smartphone 105, can see and manage one of multiple communication devices 100 under a single account. In this example, the smartphone display is indicative of the status of the communication device named "Emily" 710. A first section of the display is reserved for device settings 720. Within the device settings 720 are separate settings for location, channels, WiFi connectivity, software version, battery, and cellular connectivity. Each of these settings may be selected, toggled, amended, or manipulated in some fashion to change or determine a particular status. In one embodiment, the features include the ability to remotely manipulate the channel setting and volume for a communication device. For example, the companion application may be able to instruct communication server 200 to raise the volume of communication device 100. Companion application may also be able to instruct communication server 200 to change the channel of communication device 100. Consider a communication device in the possession of an elderly person such as the parent of an adult child. The adult child may wish to contact their elderly parent using communication device 100. However, prior to sending a voice message, the adult child may wish to ensure the communication device 100 is set to the proper channel and at a volume level loud enough to hear considering the age of the parent. The companion application may include manipulatable settings for channel and volume of that communication device 100 that can be adjusted. Another setting that may be remotely adjusted may be toggling WiFi connectivity on or off as well as changing the WiFi password for a particular network.

Another portion of the display is reserved for conversation history 730 between the communication device known as "Emily" and the companion application known as "You". In this example, there are three messages in the conversation. The first message is from "Emily" sent Wednesday at 9:32 am and lasting 1:02 minutes. The second message is also from "Emily" sent today at 7:17 am and lasting five seconds. The final message is from "You" sent today at 7:27 am and lasting ten seconds. The message content for each message may be played by touching the play/pause icon on the right side.

The lower portion of the screen includes microphone/button icon 740 that causes a voice message to be recorded and transmitted while it is touched by the user. In this case, the companion application is in communication with the communication device known as "Emily" as indicated by the label 710 at the top of the screen and the label just to the left of microphone/button icon 740.

FIG. 8 illustrates an example showing how a user, via the companion application running on a smartphone 105, can receive news and updates pertaining to the communication device and services. In this example, the smartphone display 810 comprises a first area 820 that describes a new channel called 'Instant Chat' with a link for additional information. Also shown is a second area 830 describing an accessory product update. Still another area 840 describes a referral program. Yet another area 850 provides a link to a quick start guide.

Logic flow diagrams according to embodiments of the invention are presented herein. The logic flow diagrams may be representative of some or all of the operations executed by one or more embodiments described herein. Further, the logic flows may performed by circuitry and one or more components discussed herein. Moreover, logic flows may be performed in conjunction with one or more other logic flows discussed herein and lists particular steps occurring in a particular order. However, embodiments are not limited in this manner and any step may occur in any order. Further, steps of the logic flows may not be dependent upon one another and as such particular steps in the logic flows may not occur.

Figure 9:
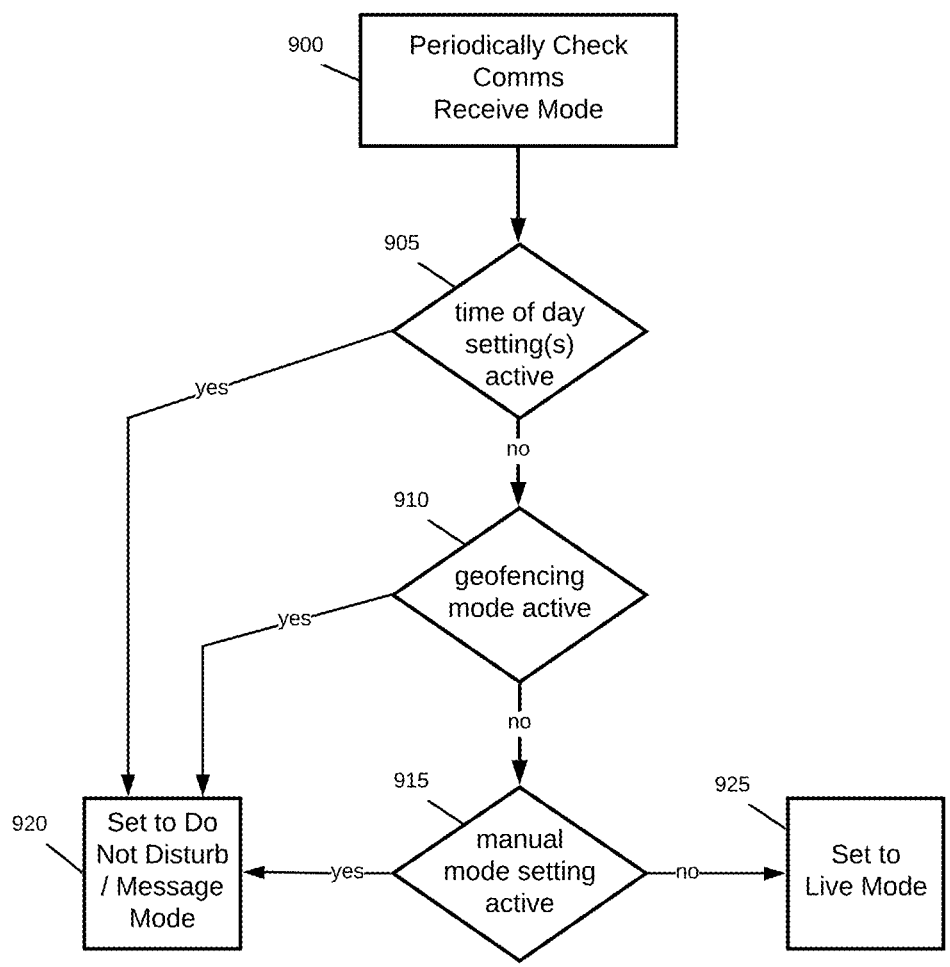
FIG. 9 is a logic flow diagram describing a process for determining the receive mode of a portable communication device according to an embodiment of the invention.

FIG. 9 is a logic flow diagram 900 describing a process of determining a communication device receive mode according to an embodiment of the invention. At step 900, the communication server 200 periodically determines the communication receive mode for the communication device 100. The communication server 200 may maintain a configurable profile used to set the communication device 100 in a live mode or a message mode. Live mode means the communication server 200 will forward incoming voice messages intended for communication device 100 in real-time allowing them to be played aloud as they arrive. Message mode means the communication server 200 will notify communication device 100 and forward incoming voice messages intended for communication device 100 to storage but not allow them to be played out loud at the time of arrival. The communication device 100 may then retrieve (if stored on communication server 200) or play (if stored on communication device 100) voice messages at a more convenient time.

There may be multiple conditions that determine whether the communication device 100 should be in receive mode or message mode. A first condition may be to determine whether there are any specific time of day settings that control the mode at decision block 905. For instance, the communication device 100 may be set to message mode at step 920 between the hours of 8:00 am-11:45 am and again between 1:00 pm and 3:30 pm to account for school hours. Voice messages received during those times will be received and stored by communication device 100 but not played out loud. Alternatively, the voice messages may be stored by communication server 200 with a notification sent to communication device(s) 100. The communication device(s) 100 may then retrieve the voice messages from communication server 200 at a more convenient time. Voice messages received outside those times indicate that communication device 100 may be set to live mode at step 925 and will be received, stored, and may be played by communication device 100.

A second condition may be to determine whether there are any specific geographic settings that control the mode at decision block 910. For instance, when communication device 100 may be set to message mode at step 920 when the device is physically located within certain areas (e.g., school, office, etc.). Voice messages received when the communication device 100 is within a designated area will be received and stored by communication device 100 but not played out loud. Alternatively, the voice messages may be stored by communication server 200 with a notification sent to communication device(s) 100. The communication device(s) 100 may then retrieve the voice messages from communication server 200 at a more convenient time. Voice messages received outside those areas indicate that communication device 100 may be set to live mode at step 925 and will be received, stored, and may be played by communication device 100.

A third condition may be to determine whether the communication device 100 has been manually set to control the mode at decision block 915. For instance, when communication device 100 is set to message mode at step 920, voice messages received will be received and stored by communication device 100 but not played out loud. Alternatively, the voice messages may be stored by communication server 200 with a notification sent to communication device(s) 100. The communication device(s) 100 may then retrieve the voice messages from communication server 200 at a more convenient time. When communication device 100 is set to live mode at step 925, voice messages will be received, stored, and may be played by communication device 100.

Figure 10:
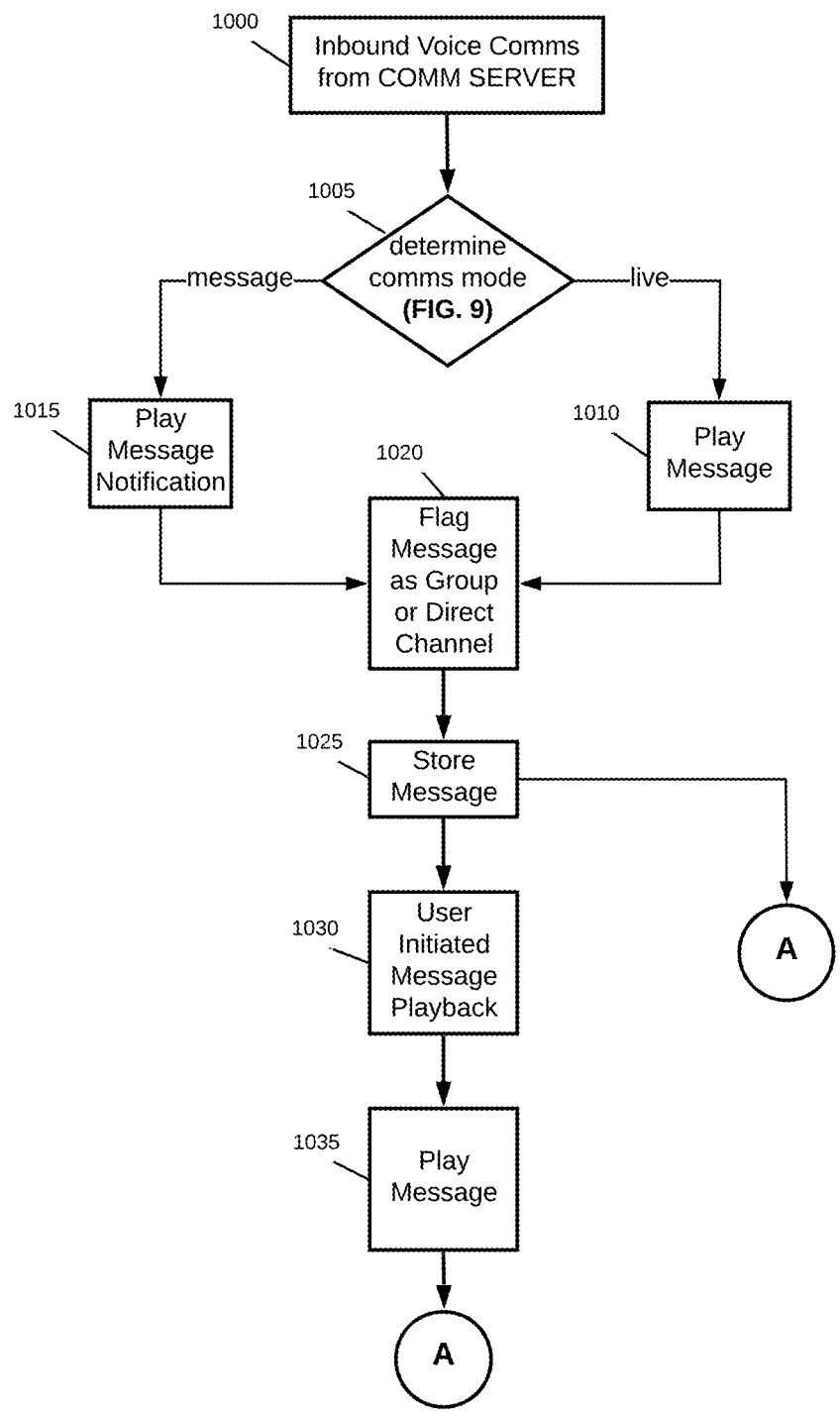
FIG. 10 is a logic flow diagram describing a process for handling received communications to a portable communication device according to an embodiment of the invention.

FIG. 10 is a logic flow diagram describing a process 1000 for handling received communications to a portable communication device 100 according to an embodiment of the invention. An inbound voice message from communication server 200 is received at step 1000. Communication server 200 first determines the receive mode for communication device 100 at step 1005. This is done using the flow diagram described in FIG. 9. If the mode is determined to be live mode, the voice message may be played at step 1010. Otherwise, if the mode is determined to be message mode, a voice message notification but not the voice message itself may be played at step 1015. The message notification may comprise any of audible tone or series of tones, or a visual indicator such as a colored or flashing light. In addition, the type of audible or visual tone may be indicative of the person sending the incoming voice message. For instance, devices associated certain people may have specific or customized tones that give the user an indication of who is trying to contact them. In addition, the voice messages may be stored locally on communication device 100 or remotely on communication server 200.

Regardless of whether the voice message is either played in full or merely notified, communication device 100 determines if the voice message came from a direct channel (e.g., an individual device) or a group channel (e.g., a multiple device channel) and flags the voice message as either 'group' or 'direct' at step 1020. The voice message may then be stored locally on communication device 100 or remotely on communication server 200 at step 1025. The user may subsequently initiate playback of the stored voice message at step 1030 causing the voice message to be played back at step 1035.

Figure 11:
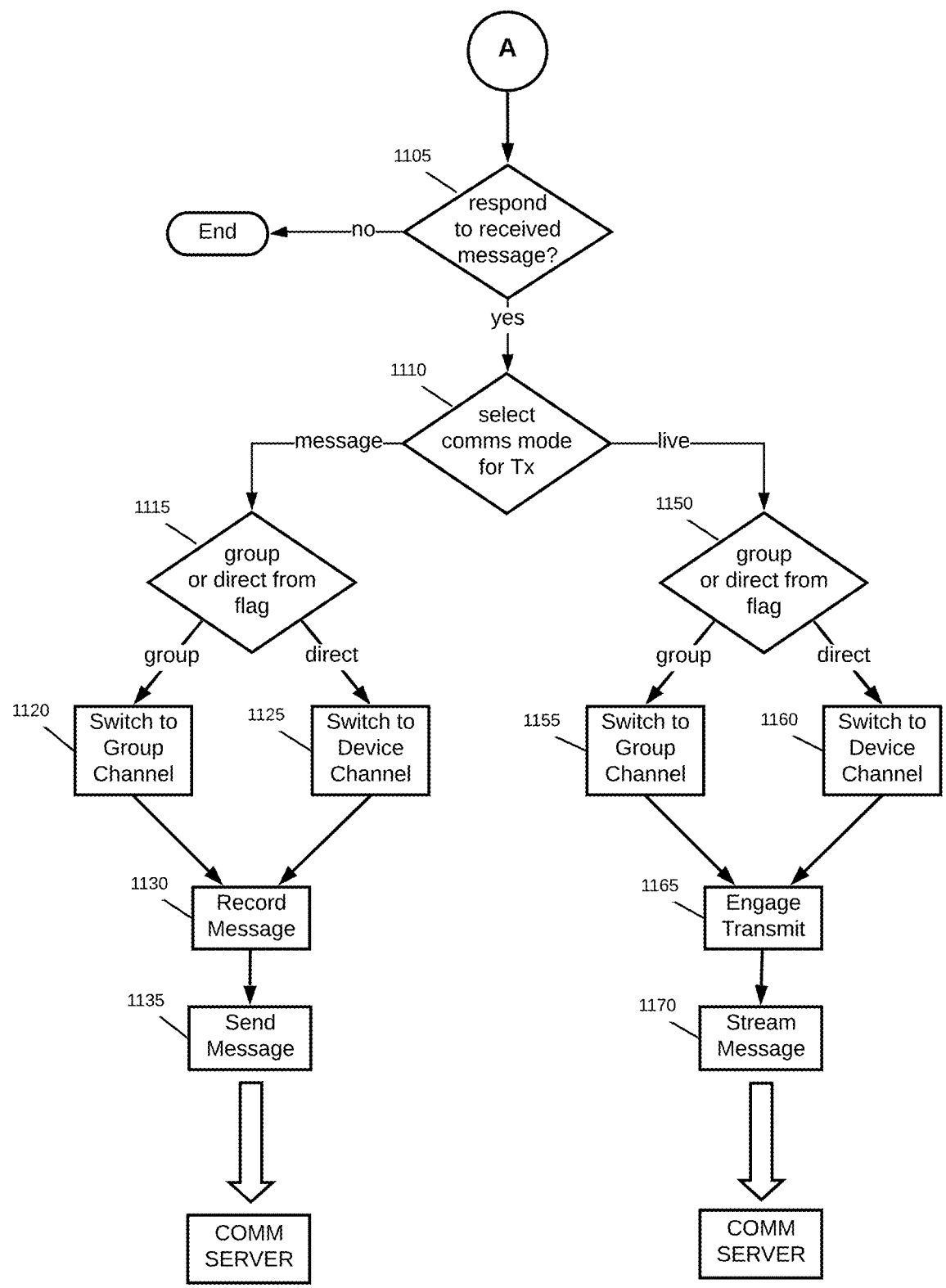
FIG. 11 is a logic flow diagram describing a process for responding to received communications to a portable communication device according to an embodiment of the invention.

FIG. 11 is a logic flow diagram describing a process 1100 for responding to received voice messages received by a portable communication device 100 according to an embodiment of the invention. Any response will be directed back to the sender(s) communication device(s). FIG. 11 picks up from FIG. 10 following the reception of a voice message with a decision block 1105 determining whether to respond to an incoming voice message. If there is no response, the process terminates. Otherwise, communication device 100 selects a communication mode for the response to be transmitted at decision block 1110. In this embodiment, the user may respond with a live mode voice message or a message mode voice message. A live mode voice message is intended to be received and played immediately whereas a message mode voice message is intended to store the response on the recipient(s) communication device(s) 100 or communication server 200 for playback at a later time.

If the selected communication mode is message mode, the communication device 100 determines if the message being responded to was received over a group channel or a direct channel at decision block 1115. This may be achieved by checking the flag included in the original voice message that was set in step 1020 in FIG. 10. If the flag is set to group, communication device 100 will switch from its current channel to the group channel associated with the voice message at step 1120. Otherwise, if the flag is set to direct, communication device 100 will switch from its current channel to the direct channel associated with the voice message at step 1125. Once communication device has been placed in the proper communication channel, the user may record a reply voice message at step 1135. The recorded voice message may then be sent at step 1135 to communication server 200 where it may be stored by communication server 200 or sent to and stored on the recipient's communication device(s) 100.

If the selected communication mode is live mode, the communication device 100 determines if the message being responded to was received over a group channel or a direct channel at decision block 1150. This may be achieved by checking the flag included in the original voice message that was set in step 1020 in FIG. 10. If the flag is set to group, communication device 100 will switch from its current channel to the group channel associated with the voice message at step 1155. Otherwise, if the flag is set to direct, communication device 100 will switch from its current channel to the direct channel associated with the voice message at step 1160. Once communication device has been placed in the proper communication channel, the user may engage the transmit mode at step 1165. The recorded voice message may then be streamed at step 1170 to communication server 200 where it will be redirected to the original sending communication device(s).

It should be noted that even though the replying communication device has selected live mode, the original sending device(s) that are now the receiving device(s) may override the live mode set by the transmitting device and convert the incoming reply message to message mode where it is stored locally for later consumption.

Figure 12:
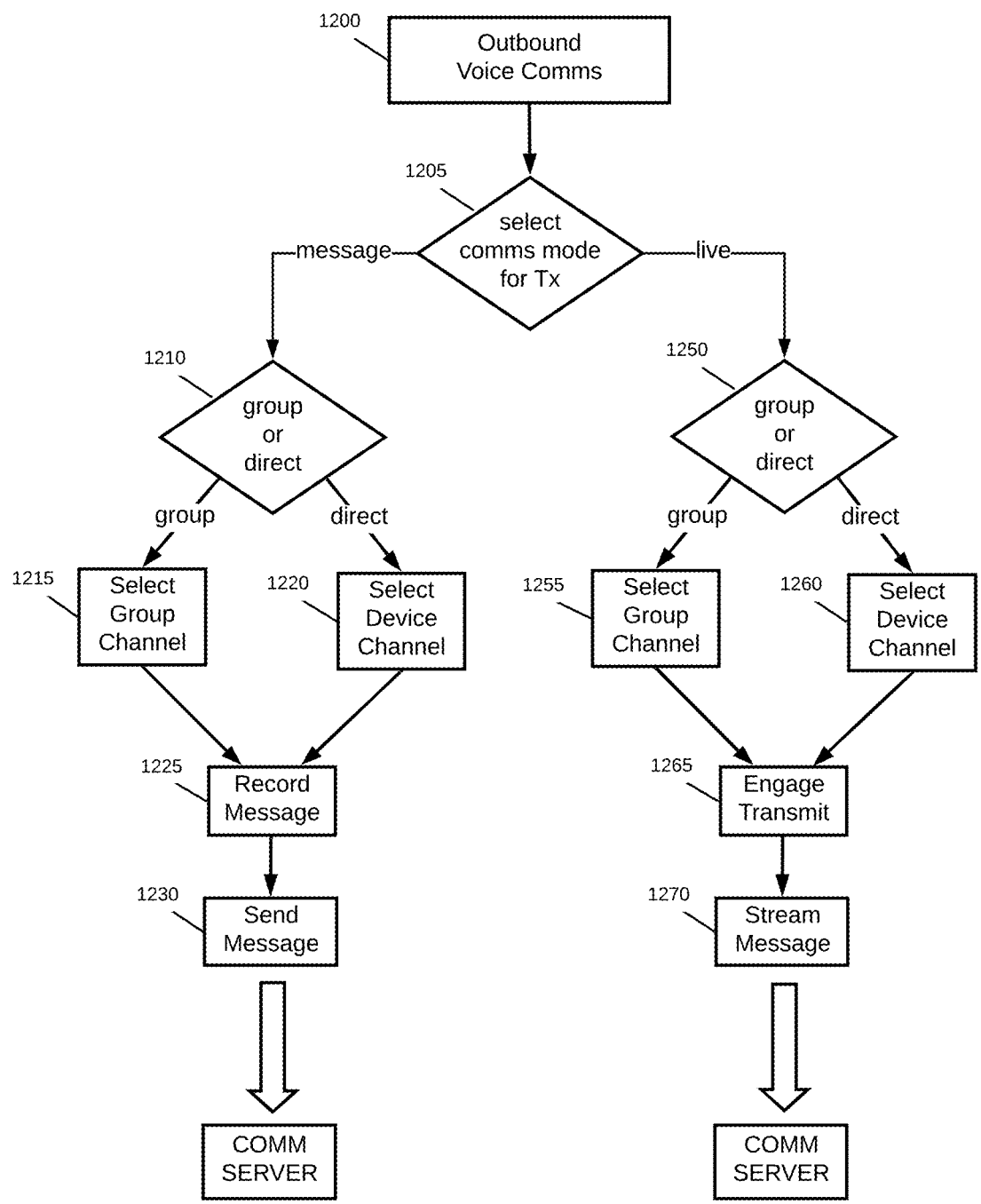
FIG. 12 is a logic flow diagram describing a first process for sending communications from a portable communication device according to an embodiment of the invention.

FIG. 12 is a logic flow diagram describing a first process 1200 for sending communications from a portable communication device according to an embodiment of the invention. The process for initiating outbound voice communications is similar to that of replying to an inbound voice communication illustrated in FIG. 11.

Communication device 100 selects a communication mode for the response to be transmitted at decision block 1205. In this embodiment, the user may respond with a live mode voice message or a message mode voice message. A live mode voice message is intended to be received and played immediately whereas a message mode voice message is intended to store the response on the sender(s) communication device(s) or in the communication server for playback at a later time.

If the selected communication mode is message mode, the communication device 100 determines if the voice message to be sent is to be sent over a group channel or a direct channel at decision block 1210. If it is determined the voice message is intended for a group, communication device 100 will determine the group channel associated with the voice message at step 1215 and switch the communication device 100 to that group channel if necessary. Otherwise, if it is determined the voice message is intended to be a direct voice message, communication device 100 will determine the direct channel associated with the voice message at step 1220 and switch the communication device 100 to that direct channel if necessary. Once communication device has been placed in the proper communication channel, the user may record a voice message at step 1225. The recorded voice message may then be sent at step 1230 to communication server 200 where it will be stored by communication server 200 for later retrieval or sent to and stored on the original sending communication device(s).

If the selected communication mode is live mode, the communication device 100 determines if the voice message to be sent is to be sent over a group channel or a direct channel at decision block 1250. If it is determined the voice message is intended for a group, communication device 100 will determine the group channel associated with the voice message at step 1255 and switch the communication device 100 to that group channel if necessary. Otherwise, if it is determined the voice message is intended to be a direct voice message, communication device 100 will determine the direct channel associated with the voice message at step 1260 and switch the communication device 100 to that direct channel if necessary. Once communication device has been placed in the proper communication channel, the user may engage the transmit mode at step 1265. The recorded voice message may then be streamed at step 1270 to communication server 200 where it will be forwarded to the intended recipient communication device(s).

In some embodiments, the user may use one of the side buttons 112, 113 on communication device 100 to toggle or switch among channels where the channels may include one or more group voice chat channels or and one or more direct voice chat channels. In addition, the main button 102 may be depressed in a predetermined manner to select the whether to send a voice message in message mode or live mode. It should be noted that the configuration and use of the various buttons on communication device 100 may be implemented to achieve the functions of channel switching and mode selection according to any number of design considerations.

It should be noted that even though the replying communication device has selected live mode, the original sending device(s) that are now the receiving device(s) may override the live mode set by the transmitting device and convert the incoming reply message to message mode where it is stored locally for later consumption.

Figure 13:
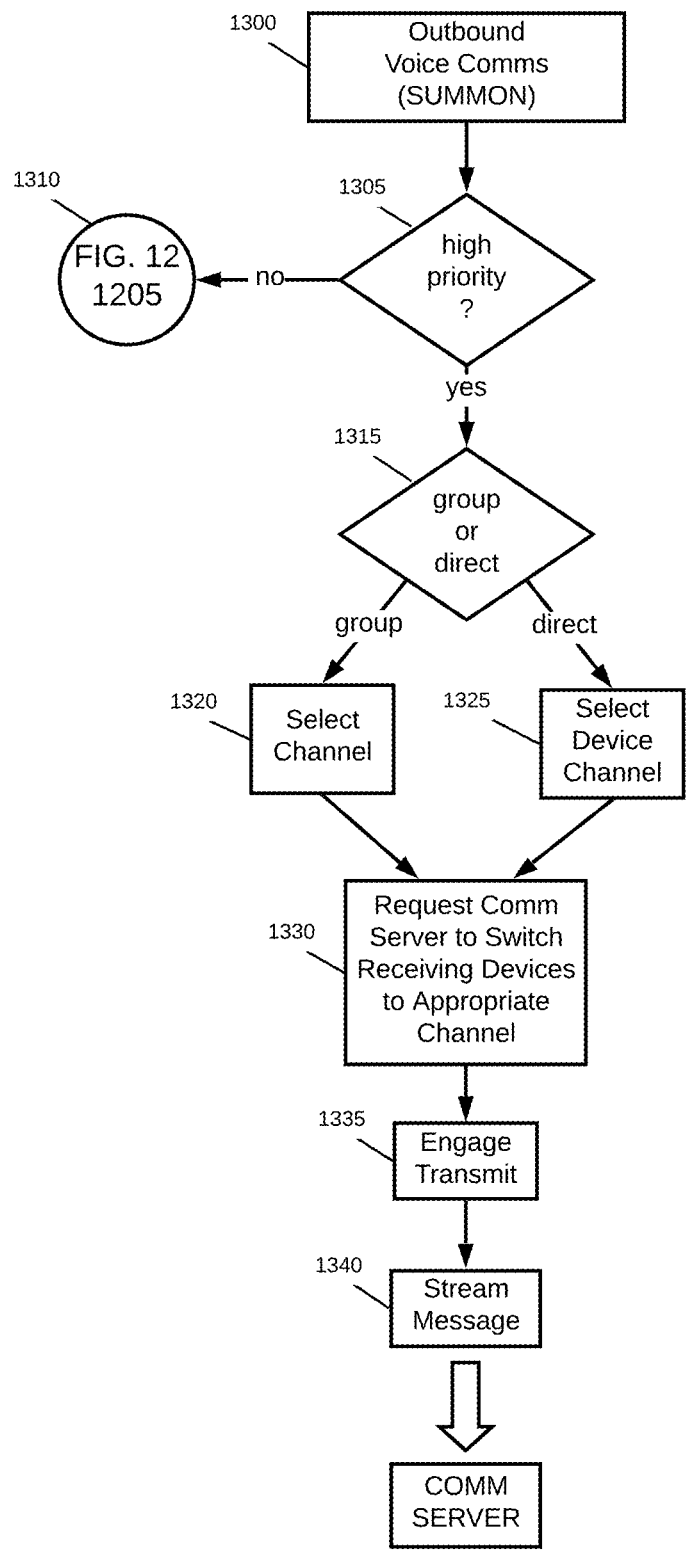
FIG. 13 is a logic flow diagram describing a second process for sending communications from a portable communication device according to an embodiment of the invention.

FIG. 13 is a logic flow diagram describing a second process 1300 for sending communications from a portable communication device according to an embodiment of the invention. This process 1300 is intended for higher priority messages in that the communication server 200 can pre-switch the communication device(s) 100 of the intended recipient(s) to the channel to be used for the voice message. Then, when the voice message is sent, the recipients will be already tuned in to receive and play the incoming message.

A first decision block 1305 determines whether the voice message to be sent is a high priority voice message. For instance, the sender may place the communication device 100 into high priority message mode through a specific button press or sequence of button presses. Alternatively, a voice command may be uttered to indicate that this message is a high priority message. If the voice message is not a high priority voice message, then control shifts to FIG. 12 as represented by the diagram connector 1310.

If the voice message is a high priority voice message, then the communication device 100 determines if the voice message to be sent is to be sent over a group channel or a direct channel at decision block 1315. If it is determined the voice message is intended for a group, communication device 100 will determine the group channel associated with the voice message at step 1320 and switch the communication device 100 to that group channel if necessary. Otherwise, if it is determined the voice message is intended to be a direct voice message, communication device 100 will determine the direct channel associated with the voice message at step 1325 and switch the communication device 100 to that direct channel if necessary. Communication server 200 may then determine all the recipient devices based on the members of channel selected and send a control instruction to those recipient devices to automatically switch the communication device to the channel initiated by the sending communication device at step 1330. Once communication device(s) have been placed in the proper communication channel, the user may engage the transmit mode at step 1335. The user may record the high priority voice message that may then be streamed at step 1340 to communication server 200 where it will be forwarded to the intended recipient communication device(s). An optional feature would return each communication device to the channel it was last using before the high priority message once the high priority session expires. If some group members are not connected to the network at the time of transmission, the live message may be stored on communication server 200 for the intended communication device 100 and an urgent message notification may be sent and waiting when the communication device 100 reconnects to the network.

Because this process allows the sending device to control certain aspects of the recipient devices, it may be reserved for users with administrative privileges on the account controlling the communication devices 100. These privileges may be granted to other communication devices in the account based on the discretion of the account owner.

Figure 14:
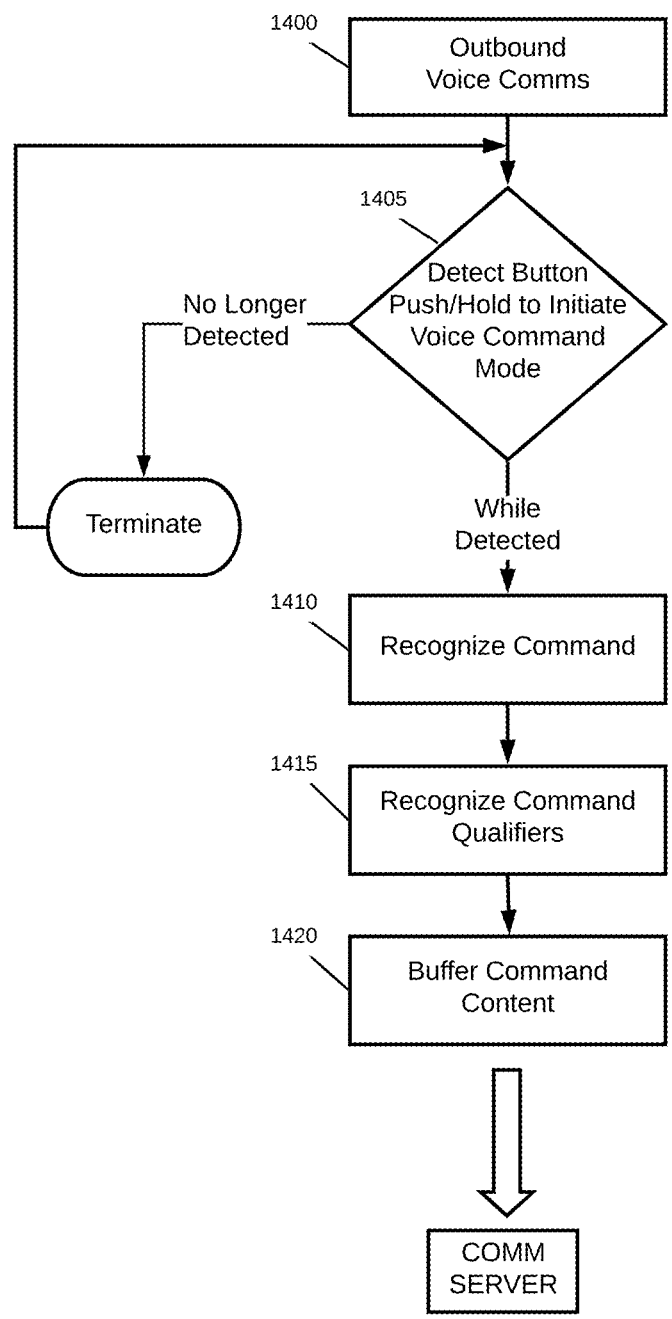
FIG. 14 is a logic flow diagram describing a third process for sending communications from a portable communication device according to an embodiment of the invention.

FIG. 14 is a logic flow diagram describing a third process 1400 for sending communications from a portable communication device according to an embodiment of the invention. This process 1400 is directed toward voice control of a communication device 100 to initiate an outbound voice message.

A first decision block 1405 detects whether there has been a button push to initiate a voice command mode. For instance, button 114 on communication device 100 may be pressed and held to indicate communication device 100 is listening for specific command keywords. Once a button push/hold is no longer detected, the process 1400 may be terminated until the next detected button press and hold. Otherwise, while the button press and hold is still detected, communication device 100 may recognize commands at step 1410. For instance, commands for initiating a voice message may include phrases including, but not limited to, "message", "message now", "tell", "tell now", "send", "send now", or the like. Commands with the word 'now' may be used to indicate that the voice message is going out in live mode rather than message mode.

Once a command has been recognized at step 1410, communication device 100 may then recognize any command qualifiers at step 1415. A command qualifier may include the group channel name or direct channel name that the voice message will be sent over. For instance, the user may wish to send a voice message to his friend Jack for which there is a direct channel set up with the label 'Jack'. In that case the command qualifier Jack instructs the communication server 200 to use the channel 'Jack' when sending the message. Another command qualifier may indicate the language to send the message. For instance, the user may specify the message go out in Spanish rather than English. This would cause the communication server 200 to perform a translation on the message prior to forwarding it to its destination. The last step in this voice controlled messaging process 1400 may be to buffer the actual content of the message to be sent at step 1420 before sending everything to communication server 200 for parsing and processing.

While the detected button press for voice control is ongoing and putting the steps of process 1400 together may yield a voice command example such as "Message Jack in Spanish "Take your lunch break at 12:30"". When this command structure is received at communication server 200, a voice message is constructed in the channel 'Jack' with the content 'Take your lunch break at 12:30' translated into Spanish. This voice message may then be forwarded to the recipient Jack where he can retrieve and play it on his communication device 100.

In another example, a voice command example such as "Tell now Jack "Take your lunch break at 12:30"". This may result in communication server 200 immediately streaming the content untranslated to Jack.

Figure 15:
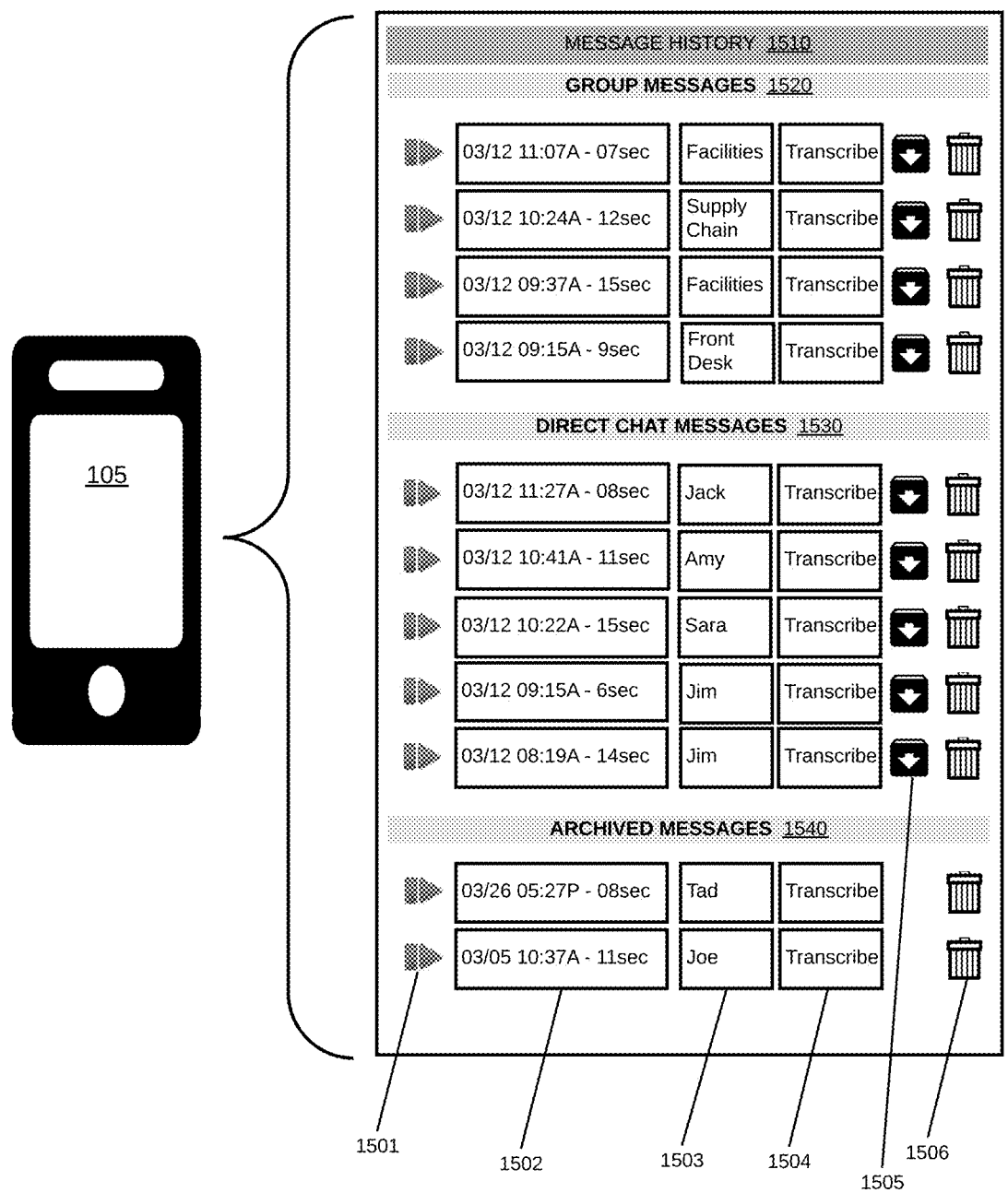
FIG. 15 is an example of a user interface displaying message history according to an embodiment of the invention.

FIG. 15 is an example of a user interface 1500 displaying voice message history 1510 according to an embodiment of the invention. In this embodiment three types of voice messages are saved: current group voice messages 1520; current direct chat voice messages 1530; and archived voice messages 1540. The current group voice messages 1520 and direct chat voice messages 1530 are equivalent to an inbox meaning they have not been deleted or archived yet. The archived voice messages 1540 represent all voice messages that have been archived out of the current group voice messages 1520 or current direct chat channel voice messages 1530. The default presentation for all voice messages may be reverse chronological in which the most current voice messages are displayed on top of older voice messages.

The voice messages are displayed on a touch screen display of smartphone 105, for instance, that allows the selection of various icons by touching them with a finger, stylus, or other suitable apparatus. Moreover, the touchscreen may be configured to allow scrolling within each of the sections such that other voice messages not visible may be made visible by scrolling through each section. The presentation of each message may include the following: a play/pause icon 1501 configured to start and stop the playback of the voice message; an informational icon 1502 configured to show the date, time, and duration of the voice message; a channel identifier icon 1503 configured to identify the channel the voice message came in on; a transcribe icon configured to launch a transcription process that will display a readout of the voice message; and archive icon 1505 configured to move the voice message out of the current message list into the archived message list; and a delete icon 1506 configured to delete the voice message from the current list or the archived list.

For example, the first row indicates a current group voice message 1510 that was received on March 12 at 11:07 AM. The voice message lasted seven seconds and came in on the 'facilities' group channel. The user may play the voice message via icon 1501, transcribe the voice message via icon 1504, archive the voice message via icon 1505, or delete the voice message via icon 1506.

Figure 16:
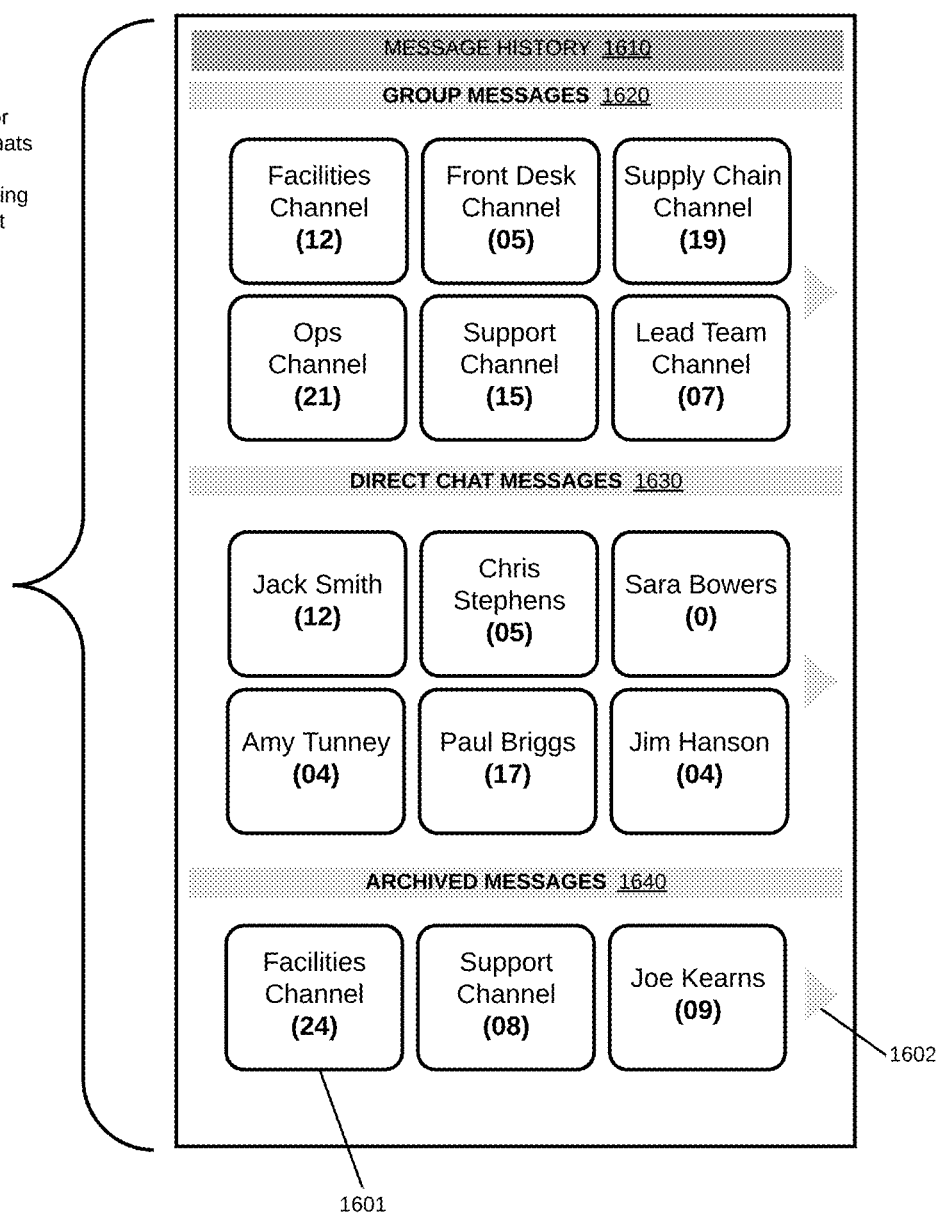
FIG. 16 is another example of a user interface displaying message history according to an embodiment of the invention.

FIG. 16 is another example of a user interface 1600 displaying message history according to an embodiment of the invention. In this embodiment, voice message history has been abstracted one level up from that illustrated in FIG. 15. In other words, selecting one of the icons in FIG. 16 will result in a display similar to that in FIG. 15.

For instance, the three types of voice messages—current group voice messages 1620; current direct chat voice messages 1630; and archived voice messages 1640—are still presented separately. In this embodiment, however, the individual messages are not displayed, just icons for the channels 1601 that those messages are stored or archived under. Because the screen real estate for a smartphone may be limited, an arrow icon 1602 is included to indicate the existence of other channels that are not currently visible but may be made visible by scrolling horizontally.

In this embodiment, there are six channel icons 1601 under the current group voice messages 1620 banner, six channel icons 1601 under the current direct chat voice messages 1630 banner, and three channel icons 1601 under the archived voice messages 1640 banner. Each channel icon 1601 is labeled with the actual channel name and the number of voice messages accessible for that channel. Selecting any one of the channel icons 1601 switches to a view similar to that of FIG. 15 in which the voice messages are displayed in reverse chronological order from newest to oldest.

It should be noted that the device shown executing the companion application in FIGS. 15-16 and illustrating the message history function is a smartphone 105. However, one of ordinary skill in the art could easily configure the display for use on a tablet, laptop, or other computer device.

Figure 17:
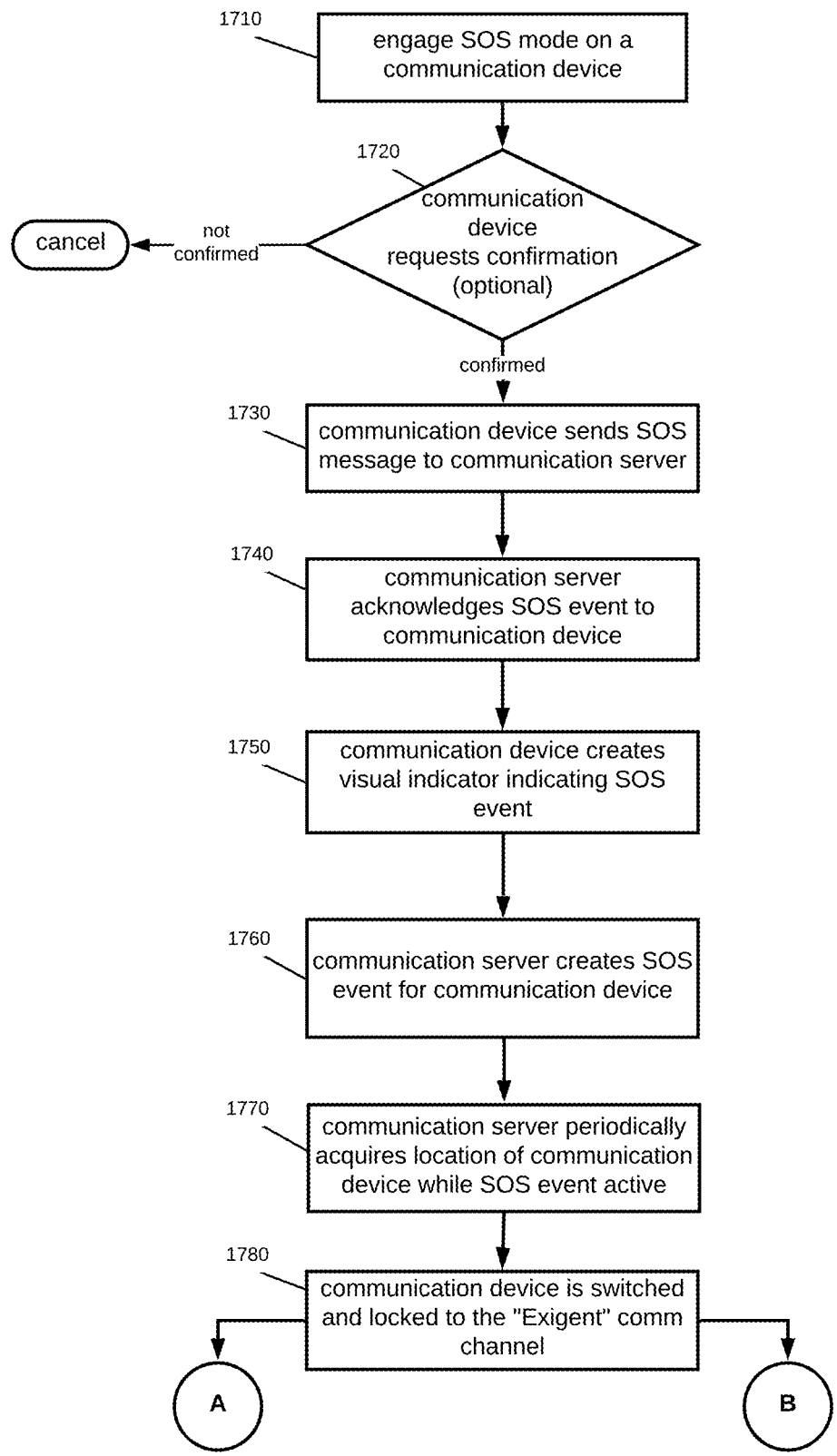
FIG. 17 is a logic flow diagram describing a process for initiating an SOS event from a portable communication device according to an embodiment of the invention.

With reference to FIGS. 16-17, it should be noted that the touchscreen display may be implemented on a tablet, laptop, or other computer device. In addition, the screen need not be a touchscreen so long as other means of navigation and selection (e.g., mouse) are available.

FIG. 17 is a logic flow diagram describing a process 1700 for initiating an SOS event from a portable communication device according to an embodiment of the invention. SOS mode may be characterized as a state in which communication device 100 is configured to: (i) recognize the user is in an emergency situation in which they may require urgent assistance; (ii) notify one or more predetermined contacts of the emergency situation; (iii) establish one or more communication links with one or more contacts or emergency personnel; and (iv) acquire and forward sensor data that may be able to assist those in contact with the initiator of the SOS event.

A user of a communication device 100 may initiate SOS mode in step 1710. For instance, the user may perform a predetermined series of button presses that are configured to place communication device 100 into SOS mode. Alternatively, the user may hold a specific button down while speaking a predetermined emergency word that when recognized, places communication device 100 into SOS mode. In one embodiment, communication device 100 may ask for an acknowledgement or confirmation of the SOS initiation at decision step 1720. If the SOS event is not confirmed it may be canceled. Otherwise, the confirmation may take the form of a verbal response or button push response. For example, communication device 100 may respond to the initiation of an SOS event with a prompt asking the user to press the talk button 102 twice to confirm the emergency. Similarly, communication device 100 may respond to the initiation of an SOS event with a prompt asking telling the user to "say 'Yes' if this is an emergency or 'No' to cancel." If the user confirms the SOS event (or if the SOS initiation does not require confirmation), communication device 100 sends an SOS message to communication server 200 at step 1730. Communication server 200 may then acknowledge the SOS event back to communication device 100 in step 1740. Upon receipt of the acknowledgement, communication device 100 may create a visual indicator letting the user know that the SOS event has been created at step 1750. The visual indicator may be in the form of a flashing or steady colored light via light ring 108.

Communication server 200 creates an SOS event for communication device 100 at step 1760. Creating an SOS event may entail a protocol that includes notification of relevant parties, location tracking, message history preservation, and establishing communication with third party emergency service providers including police, fire, or paramedic first responders.

Communication server 200 begins acquiring location data for communication device 100 on a frequent periodic basis at step 1770. As part of the record of the SOS event and to provide location data to relevant parties, communication server 200 may record, store, and even forward the location of the communication device 100 while the SOS event is active. The location data may be used to track the user of communication device 100 and guide family, friends, or first responders to the exact location of communication device 100. This may help paramedic first responders accurately locate the user or help police first responders track the user if they are moving such as in an abduction situation.

Communication device 100 may then be switched and locked into an 'exigent' communication channel reserved for SOS events at step 1780. The 'exigent' channel is a dedicated voice communication channel specific to the current SOS event. As will be described, it may be accessed by anyone associated with the SOS event initiated by communication device 100. Thus, once others are notified of the SOS event, they too may be pulled into or provided a link to join the 'exigent' channel for communication with the user that initiated the SOS event.

Figure 18:
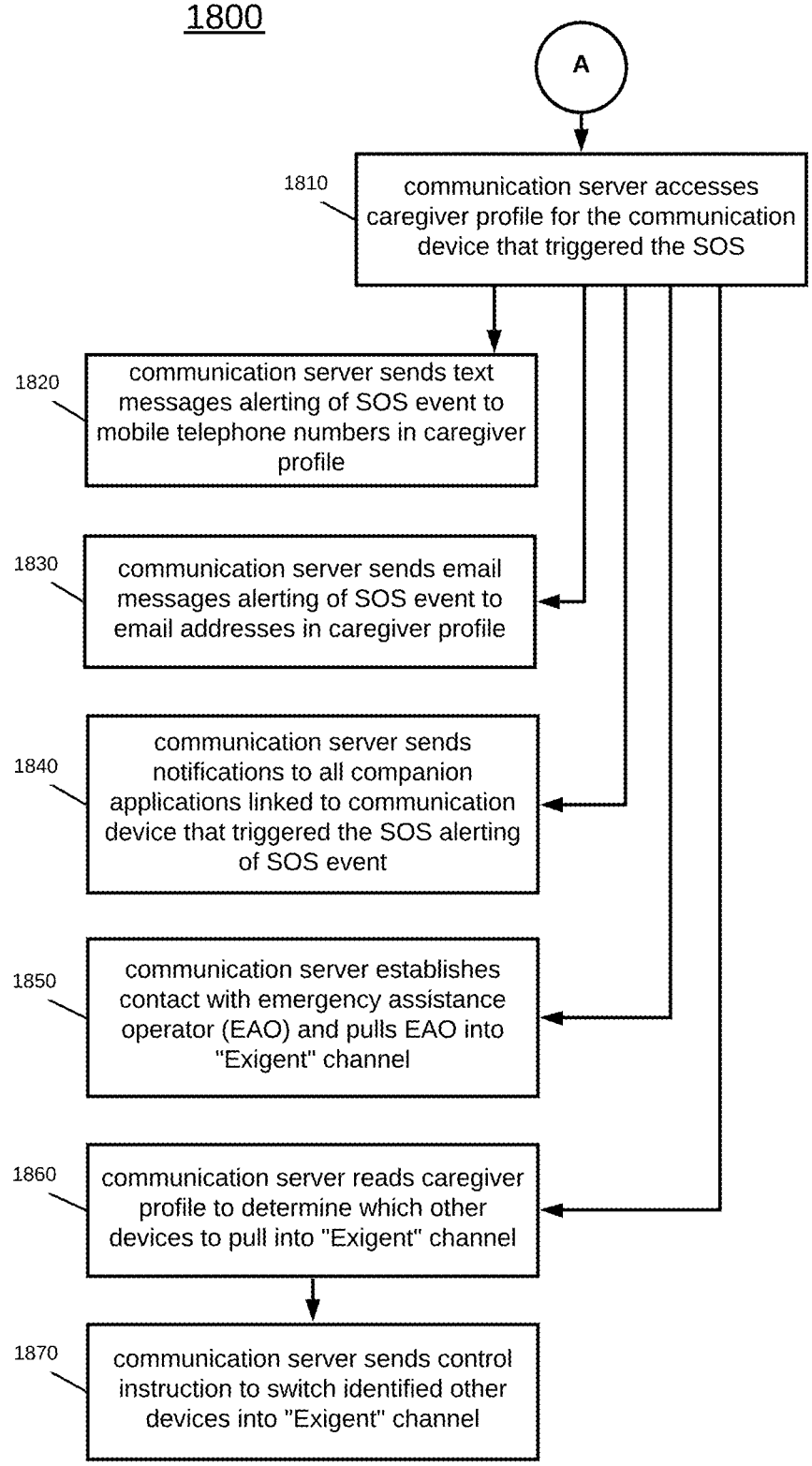
FIG. 18 is a logic flow diagram describing a process for executing an SOS event from a portable communication device according to an embodiment of the invention.

FIG. 18 is a logic flow diagram describing a process 1800 for notifying the designated parties and devices of an SOS event from a portable communication device according to an embodiment of the invention. FIG. 18 picks up from FIG. 17 after communication device has been automatically switched into the 'exigent' channel. Once the SOS event has been created by communication device 100 and confirmed with communication server 200, the protocol for the SOS event may be initiated. Part of the protocol may be stored in a caregiver profile stored in or accessible to communication server 200. The caregiver profile may include the names of contact people that should be immediately notified of the SOS event as well as the devices through which they may be reached. Communication server 200 may access that communication device's caregiver profile at step 1810. Once the caregiver profile has been accessed, communication server 200 may then perform several processes in parallel. One such process may send text messages to any mobile telephone numbers contained in the caregiver profile alerting of the initiation of the SOS event at step 1820. The content of the text message may specify that communication device 100 (or the name/label associated with communication device 100) initiated an SOS event at 09:37 am. As will described later, the text message may also include a link to an incident record page. The recipient of the text message may click the link to go to a live page that provides real-time updates of the situation and the ability to join the 'exigent' communication channel.

Another process may send email messages to any email addresses contained in the caregiver profile alerting of the initiation of the SOS event at step 1830. As with the text message described above, the content of the email message may specify that communication device 100 (or the name/label associated with communication device 100) initiated an SOS event at 09:37 am. Similarly, the email message may also include a link to an incident record page. The recipient of the email message may click the link to go to a live page that provides real-time updates of the situation and the ability to join the 'exigent' communication channel.

Another process may send a companion application notification to any companion applications linked to the same account of the communication device 100 alerting of the initiation of the SOS event at step 1840. As with the text message described above, the content of the companion application notification may specify that communication device 100 (or the name/label associated with communication device 100) initiated an SOS event at 09:37 am. Similarly, the companion application notification may also include a link to an incident record page. The recipient of the companion application notification may click the link to go to a live page that provides real-time updates of the situation and the ability to join the 'exigent' communication channel.

Still another process has the communication server 200 establish a connection with a third party emergency assistance operator at step 1850. Communication server 200 may also pull the emergency assistance operator into the exigent communication channel established for the SOS event so that the emergency assistance operator can assess whether further emergency assistance (e.g., fire, paramedic, police) is warranted. Thus, an emergency assistance operator may be joined to and associated with every SOS event.

Still another process has the communication server 200 determine from the caregiver profile any other devices to pull into the 'exigent' channel at step 1860. For instance, if there are other similar communication devices on the same account as the SOS event initiating communication device 100, they may be automatically alerted (e.g., warning tone/chirp) and automatically switched into the 'exigent' channel for immediate communication with the SOS event initiating communication device 100 at step 1870.

Figure 19:
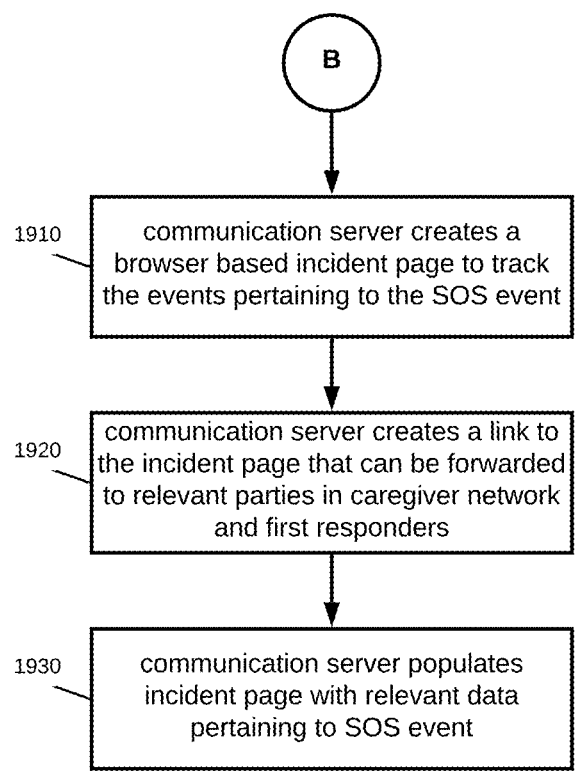
FIG. 19 is a logic flow diagram describing a process for providing information pertaining to an SOS event from a portable communication device according to an embodiment of the invention.

FIG. 19 is a logic flow diagram describing a process 1900 for providing information pertaining to an SOS event from a portable communication device according to an embodiment of the invention. The information provided may be characterized as an incident record page as mentioned earlier. FIG. 19 picks up from FIG. 17 after communication device has been automatically switched into the 'exigent' channel. Once the SOS event has been created by communication device 100 and confirmed with communication server 200, communication server 200 may create a browser based or application based incident record page to track the events and communication pertaining to the SOS event triggered by communication device 100 at step 1910. Communication server 200 may then create a link (e.g., URL) associated with the incident record page at step 1920.

The link may be forwarded to relevant parties in the caregiver profile so as to allow them to see real-time data and communications for the SOS event. Moreover, anyone with the link may forward it to another party to permit that other party the same access. This is especially useful when medical or police help may be needed as the first responders or police officers can start to understand the situation prior to arriving on scene. For example, assume one of the parties in the caregiver profile is a third party emergency provider. That emergency provider may automatically be looped in to the SOS event similar to a home alarm service provider is involved when a home alarm is triggered. The third party emergency provider may assess the situation and either on their own or by request of another party initiate a true 911 emergency call. The third party emergency provider remains the direct point of contact with the first responders and can provide them with the link to the incident record page where they can get a feel for the situation to which they are responding. Moreover, the incident record page may include a join exigent channel icon that can put the first responders in direct contact with all those in the exigent communication channel.

Once the incident record page link has been established, communication server 200 may then populate the template for the incident record page with data obtained since the SOS event was triggered at step 1930.

Figure 20:
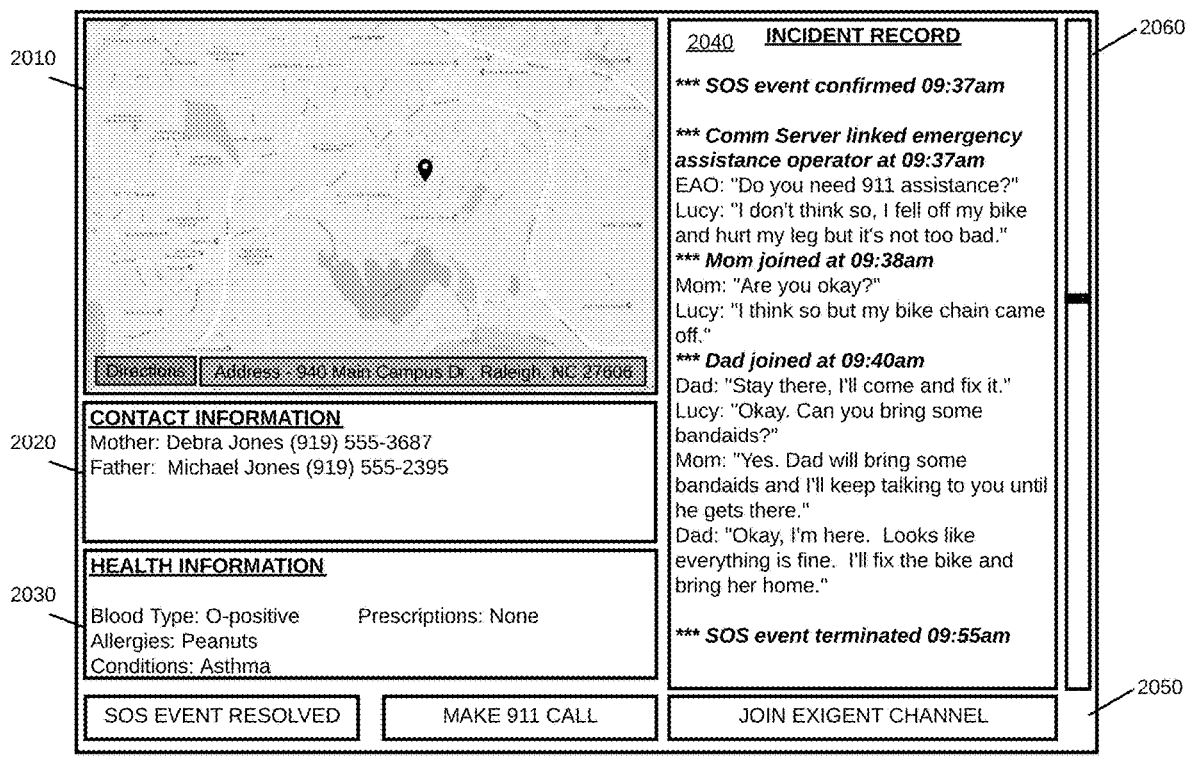
FIG. 20 is an example of a user interface displaying information pertaining to an SOS event on a computer or tablet according to an embodiment of the invention.

FIG. 20 is an example of an incident record page 2000 displaying information pertaining to an SOS event on a computer or tablet according to an embodiment of the invention. The incident record page 2000 may be segmented into six (6) sections. These sections may include a map 2010 with the location of the communication device 100, a contact information section 2020, a health information section 2030, a transcription section 2040, a join exigent channel icon 2050, and a scroll bar section 2060.

The map section 2010 provides a pin or flag that pinpoints the exact location of communication device 100. This information is updated frequently in case the communication device is in motion. The map section 2010 may further include a 'directions' icon that, when actuated, may provide audible turn by turn instructions to the location of communication device 100. In addition, a route may be highlighted on the map itself and/or a portion of the map section may be repurposed to visually dynamically display written directions.

The contact information section 2020 may include the names, relationships, and telephone numbers of people associated with the user of communication device 100. This information may be input ahead of time in a registration process and may also have been gleaned from the caregiver profile.

The health information section 2030 may include information directly applicable to the user of communication device 100. For instance, data such as blood type, allergies, chronic conditions, and prescriptions may be listed. This and potentially other health information may greatly assist first responders before they even arrive on scene—especially if the user is unresponsive by the time help arrives.

The transcription section 2040 may serve to keep a record of all communication from all parties in the exigent channel. The audio of each person may be transcribed into text and labeled in chronological order (newest on top) identifying the speaker. While not shown in the diagram, color may be used in any one of these sections to provide emphasis or enhancement to any piece of data. For instance, in the transcription section, anytime the SOS event initiator speaks, the transcription may be colored red to indicate this is the person that needs assistance.

The join exigent channel icon 2050 may be invoked to cause the device (provided it is equipped to do so) displaying the incident record page to join the exigent channel and permit the sending and receiving of audio with other devices in the exigent channel.

The content in the example of FIG. 20 reveals that Lucy (communication device 100 user) initiated an SOS event at 09:37 am. The map section 2010 pinpointed her location at 940. Main Campus Dr. in Raleigh, N.C. The contact information section 2020 lists her father and mother with their telephone numbers. The health information section 2030 provides her blood type 0+, peanut allergy, asthma condition, and prescription information (none currently). The transcription section 2040 shows the emergency assistance operator joined the exigent channel at 09:37 am as part of the automatic protocol for an SOS event. The emergency assistance operator asked if Lucy needs 911 assistance. Lucy responded using the communication device 100 to say she fell off her bike and hurt her leg but that she probably does not need 911 assistance. Her mother joined the exigent channel shortly thereafter at 09:38 am and responded with "are you okay?" Lucy responded followed by her Dad joining the exigent channel at 09:40. Dad told her to stay put and he would be right there. Lucy and Mom exchanged a couple more messages before Dad arrived and provided a final voice message before the SOS event was terminated at 09:55 am.

Figure 21:
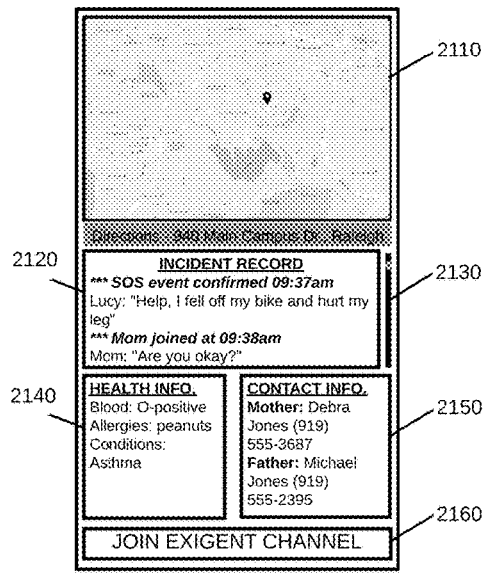
FIG. 21 is an example of a user interface displaying information pertaining to an SOS event on a mobile device or smartphone according to an embodiment of the invention.

FIG. 21 is an example of an incident record page 2100 displaying information pertaining to an SOS event on a mobile device or smartphone according to an embodiment of the invention. The mobile version of the incident record page 2100 is similar to that of the computer or tablet version. The sections may be configured to account for the smaller display screen typically associated with a mobile device such as a smartphone. The same information may displayed on the mobile version as on the tablet/computer version.

Figure 22:
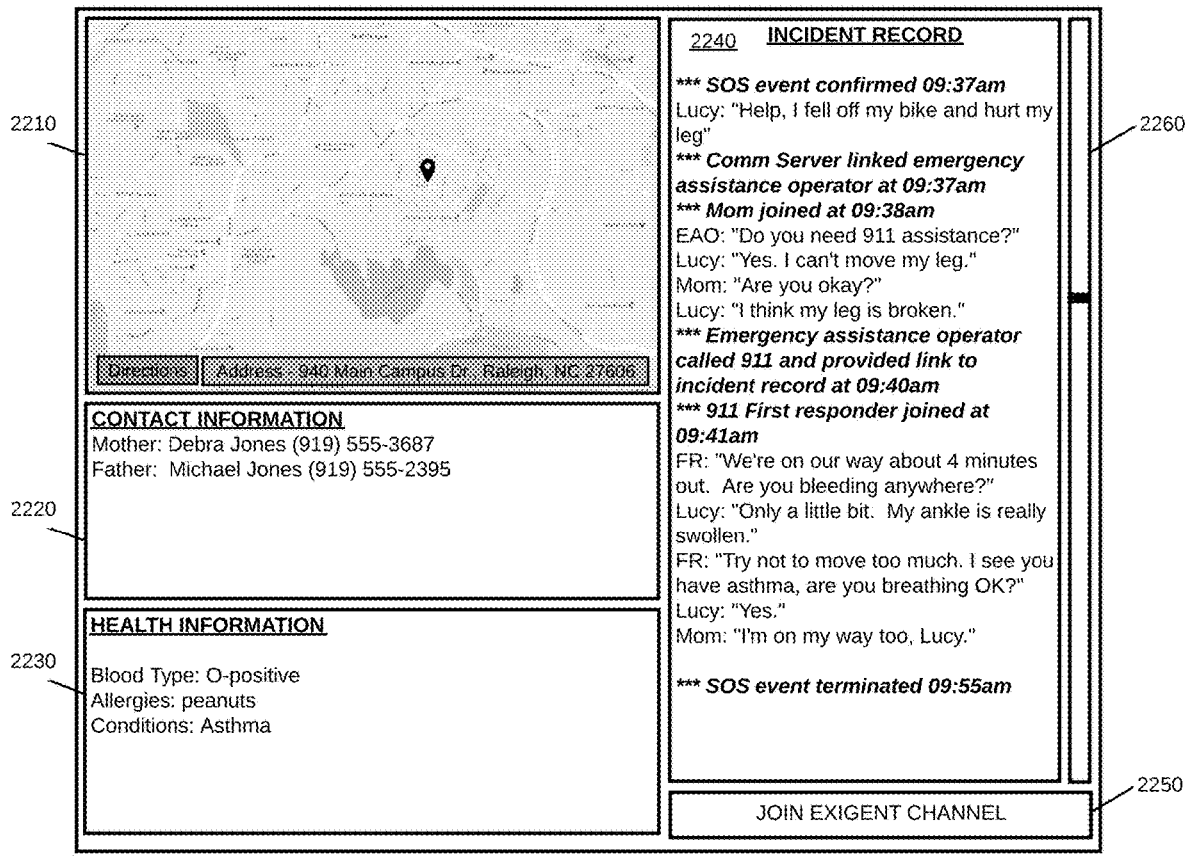
FIG. 22 is an example of a user interface displaying information pertaining to another SOS event on a mobile device or smartphone according to an embodiment of the invention.

FIG. 22 is another example of an incident record page 2200 displaying information pertaining to an SOS event on a computer or tablet according to an embodiment of the invention. In this example, an emergency assistance operator gets involved in the SOS event and is able to coordinate with a 911 dispatcher and first responders. The map 2210, contact information 2220, and health information 2230 sections are the same as in FIG. 20 because they are for the same communication device 100 and, for purposes of illustration, the SOS event occurs at the same location. This time in the transcription section 2240 when the emergency assistance operator asks if Lucy needs 911 assistance, Lucy responds she does because she can't move her leg. The emergency assistance operator then contacts a 911 dispatcher on behalf of Lucy and provides the link to the incident record. The 911 dispatcher dispatches paramedic first responders to the address given by the emergency assistance operator. The emergency assistance operator or 911 dispatcher may then forward the incident record link to the first responders on one of their devices while they are enroute. The incident record link allows the first responders to quickly glean information for this SOS event and further allows them to establish direct contact with the user (Lucy) as well as others in the exigent communication channel. When the first responders arrive, much of the information they may need will have already been presented to them making their assistance that much more efficient.

Specifically in this example, the first responders join the exigent channel at 09:41 am and inform Lucy they are 4 minutes away and ask if she is bleeding anywhere. Lucy replies she is bleeding only a little bit but her ankle is really swollen. The first responders note her asthma condition and ask if she is breathing OK to which Lucy replies she is breathing fine.

Figure 23:
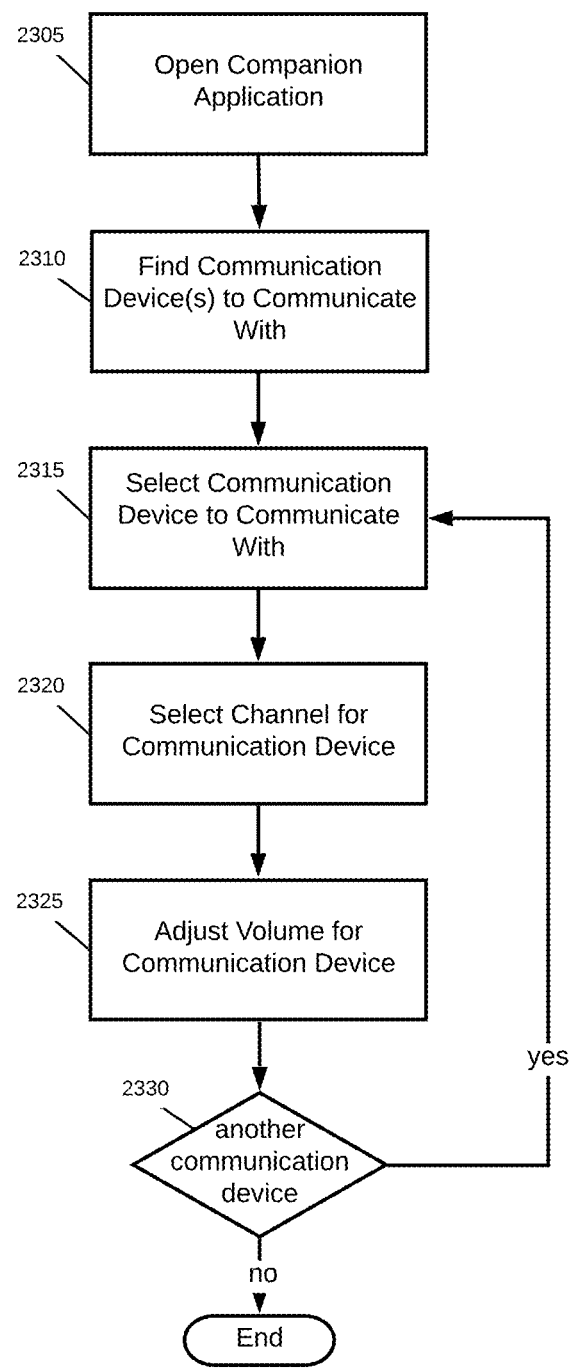
FIG. 23 is a logic flow diagram describing a process for remotely manipulating a portable communication device according to an embodiment of the invention.

FIG. 23 is a logic flow diagram describing a process 2300 for remotely manipulating a portable communication device 100 according to an embodiment of the invention.

One hurdle to overcome in a communication system that does not utilize a traditional telephony "ring" or alert type notification mechanism to start a conversation like that described herein is to ensure the other party is ready to receive an inbound voice message if it is deemed an emergency or exigent message. On particular example of this type of communication may involve attempts to reach or communicate with an elderly parent. Often, an elderly person in possession of a communication device may have the volume set a bit too low and/or may have the communication device set to a different voice communication channel when contacted by an adult child using a voice communication channel specifically configured for them.

For instance, Greg and Greg's mother may each have their own communication devices and companion applications running on other devices in which a voice communication channel has been specifically configured for those devices called "Greg/Mom". In addition, the communication devices may have several other channels configured. Greg's mother may not be using the communication device presently but may remain on a different channel from when it was last used. Thus, when Greg attempts to reach Mom on their channel, it will go through the notification process and the voice message may be missed initially. FIG. 23 offers a solution.

In this embodiment, Greg may open a companion application and navigate to a page that lists the communication devices accessible to the companion application at step 2305. Greg may peruse the communication devices to find the communication device (e.g., Greg's mother) he wishes to communicate with at step 2310 and select it at step 2315. Once selected, the companion application may then display all voice communication channels accessible to both Greg and Greg's mother such that Greg may select the appropriate communication channel at step 2320. The companion application may also receive and display information from communication server 200 indicative of the volume setting for the communication device attributable to Greg's mother. The display may further allow Greg to manipulate the volume such that communication server 200 sends a control command to raise the volume level for Greg's mother's communication device at step 2325. Since voice channels may include more than two participants, a decision step 2330 inquires whether any other communication devices should be manipulated. If the answer is affirmative, control returns to step 2315 where Greg may select another communication device.

Greg may use the companion application to set Greg's mother's communication device to a specific channel and turn the volume up. Now when he wants to make sure his mother will hear the message, he can pre-configure her communication device to set it to the right channel and at a loud enough volume for her to hear.

Figure 24:
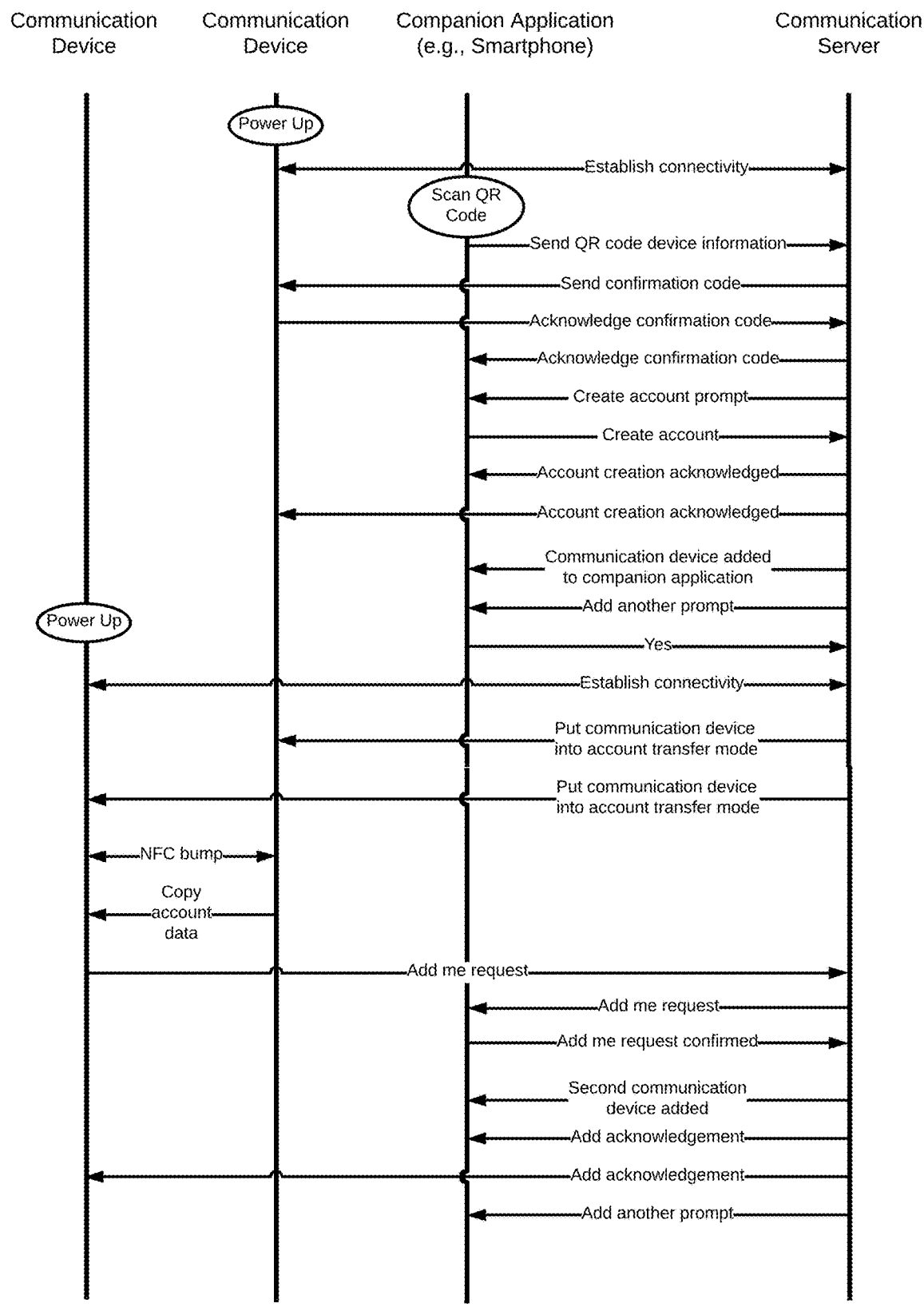
FIG. 24 is a message flow diagram describing a process for activating a portable communication device on an account according to an embodiment of the invention.

FIG. 24 is a message flow diagram describing a process 2400 for activating a portable communication device 100 according to an embodiment of the invention. Activating and linking a communication device to an account can be challenging when the communication device is screenless. The only input mechanisms are a couple of buttons on the communication device and a microphone for audio input. Adding and configuring the communication device to a monthly recurring payment plan should be made as easy and intuitive as possible for the end user. Otherwise, the frustration level associated with the communication device may exceed the user's tolerance leading to abandonment of the communication device and service. FIG. 24 is one example of an activation process for such a communication device.

In this example, there are three (3) components that exchange data to activate a communication device 100. The components include the communication device 100 itself, a communication server 200, and a companion application that typically executes on a computer device that does have a display screen and keyboard (including touchscreen keyboard) type of input mechanism. The communication device 100 will typically arrive in a box. Once removed from the box, the communication device 100 may be powered up. Once powered up, communication device 100 may automatically establish connectivity to communication server 200. From a hardware perspective, communication device includes an RF cellular band radio that may come preloaded with a subscriber identity module (SIM) card (if necessary). The software and data embedded on communication device 100 may cause it to establish connectivity with communication server 200. Communication server 200 may then determine that this particular communication device 100 is not yet activated within the system under an account. The box (or some other correspondence) associated with communication device 100 may include a quick response (QR) code (or other barcode) printed thereon. The user may use her smartphone camera and associated QR code reader application to scan the box's QR code. The data embedded within the QR code may include specific communication device identification information as well as a link and automatically executed instruction to download a companion application to the user's smartphone. The companion application once downloaded may automatically go into activation mode and send the communication device identification information obtained from the QR code to the communication server. The communication server may then send a confirmation code (e.g., an audible alpha-numeric string directly to the communication device with audible instructions to repeat the confirmation code in a transmission back to the communication server. If the user successfully acknowledges receipt of the confirmation code, the communication server sends an acknowledgement to the companion application. At this point, the communication device has been connected to the communication server and associated with a companion application of the user. The communication device has not yet been activated under an account because the user has not yet created the account. Thus, the communication server initiates a create account prompt to the companion application. The companion application then takes the user through a series of steps and prompts to create a new account. This may include inputting payment means and agreeing to terms and conditions of the service. Once the account is created, an acknowledgement may be sent to the companion application and also directly to the communication device informing the user that the account has been created and the communication device has been added to the account. The communication server may then cause the companion application to prompt the user whether to add another communication device to the account. If the answer is yes, the second communication device is powered up and establishes connectivity with the communication server. The communication server may then remotely place each communication device into an account transfer mode. The communication devices may be equipped with a near field communication (NFC) chip. Bumping the two communication devices together while both are in account transfer mode may cause the account information contained on the first communication device to be copied to the second communication device. The second communication device may then send an 'add me' request to the communication server. The communication server then presents the 'add me' request to the user through the companion application. The user can then verify/confirm that the second communication device should be added to the account by confirming the request back to the communication server. The communication server then adds the second communication device to the account and notifies both the companion application and the second communication device via an audible alert.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Figure 25:
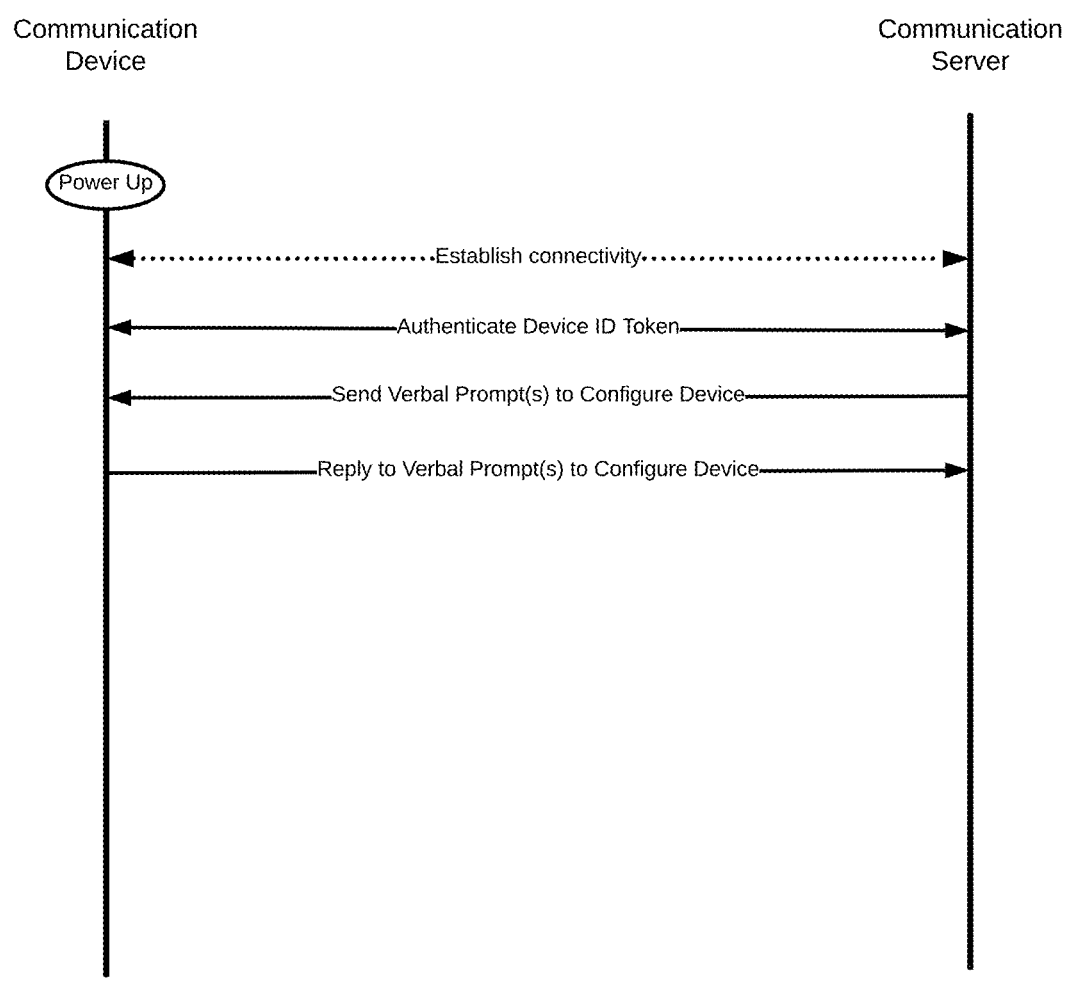
FIG. 25 is a message flow diagram describing a process for activating a portable communication device independent of an account according to an embodiment of the invention.

FIG. 25 is a message flow diagram describing a process 2500 for activating a pre-paid portable communication device 100 according to an embodiment of the invention. In this example, the communication device(s) are pre-loaded with a device ID token. The device ID token for these particular devices may identify them as having prepaid service for a predetermined amount of time from the date of activation. For instance, a device sold for $99 may come with 1-year of voice chat services while a device sold for $149 may come with 2-years of voice chat services. Because some level of service has been prepaid, these devices should be very easy to activate right out of the box. In addition, these devices do not need to be linked with a particular account.

When the communication device 100 is powered up, it automatically establishes a connection with the communication server 200 over a network. Moreover, a device ID token may be authenticated in an exchange between the communication device and the communication server. The device ID token may be embedded into the communication device at the time of manufacture. The device ID token uniquely identifies that communication device and any characteristics that may be associated therewith such as its prepaid status. Once powered up, the communication device may send the token to the communication server where it is authenticated by the communication server as a known and valid communication device. At this point, the communication server can initiate an activation process that will enable the communication device to communicate with other communication devices managed by the communication server. For instance, the communication server may send a verbal prompt to the communication device taking the user through a configuration process. For instance, the user may be prompted to give the communication device a name. The user may respond with a word or short phrase that the communication server will use as a label for the communication device.

Once configured, the communication device may be ready to engage in communications with other communication devices over specific channels. One such technique to create a channel for direct or group voice chats may be the previously described NFC bump against other active communication device(s). Additionally, a user may still download the companion app to their smartphone or other computer device and link it to the communication device to help configure and mange it. The communication device may be linked to an actual account at later date so as to provide access to additional or premium features.

As stated earlier, one of the challenges for a screenless communication device such as the one described herein is the user interface and the user experience. With no visual queues or keyboard for input, the primary user interface(s) are the speaker, microphone, and physical buttons. The speaker can output audio to the user comprising prompts, general information, and content. The microphone can receive audio input comprising commands/instructions and content. The physical buttons may be configured to manage and switch among modes and channels. In addition, the processor(s), software, and network connectivity associated with the communication device may be able to implement speech recognition to convert user audio input into commands or instructions. Thus, being able to easily manage the communication device so as to operate it in multiple modes is key to user acceptance and adoption of such a communication device. For instance, a communication device may be set to a specific channel for direct voice chats with another communication device. Within that channel there may be a history of voice messages exchanged. The user may wish to review and/or manipulate those messages. To do so, the communication device should be in a control mode within that channel as opposed to a communicate mode. The control mode may be configured to do more than review and manipulate message history. Control mode may be used to add or delete other communication devices to the channel.

Figure 26:
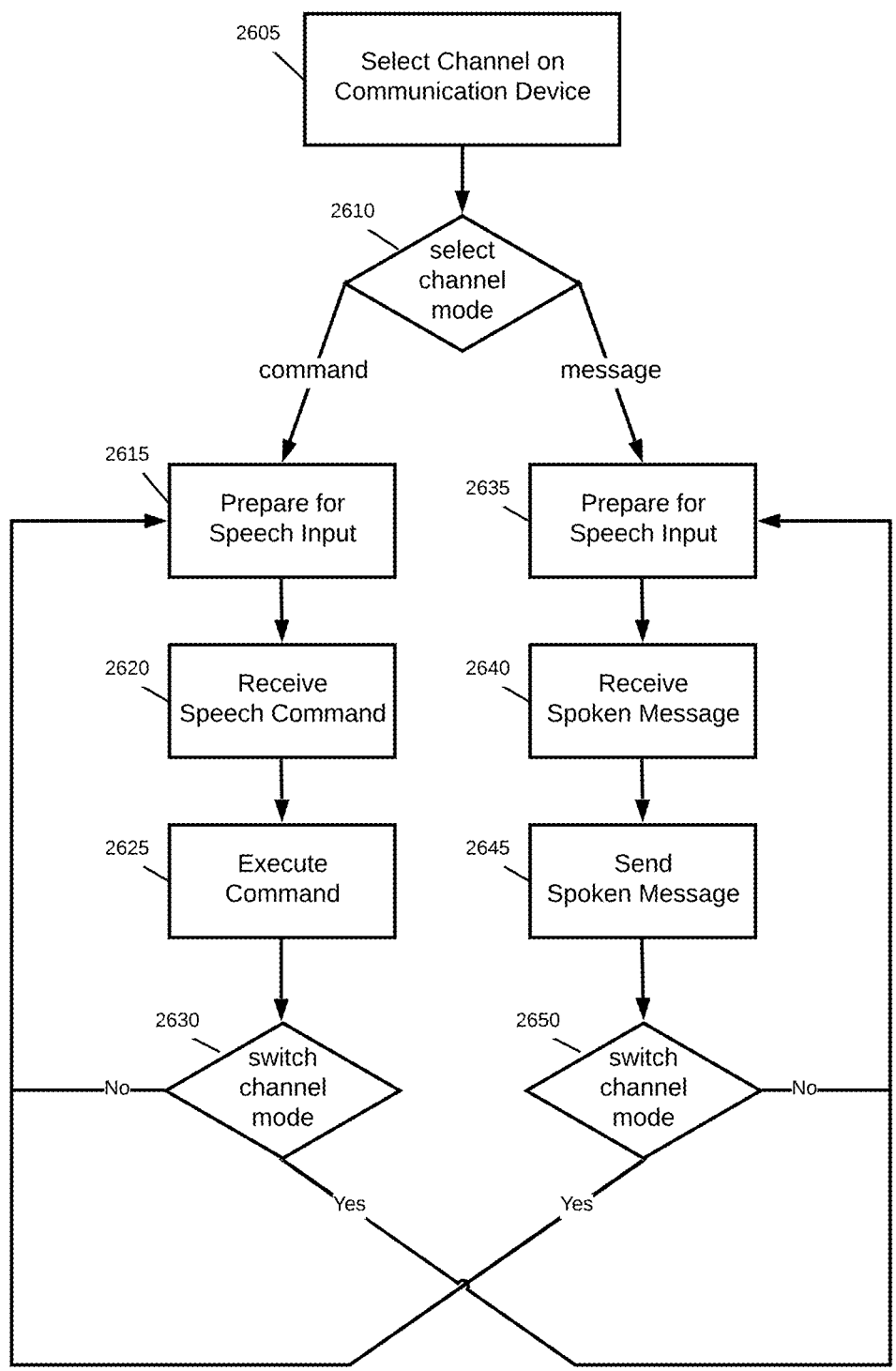
FIG. 26 is a logic flow diagram describing a process for managing a voice chat channel within a communication device according to an embodiment of the invention.

FIG. 26 is a logic flow diagram describing a process 2600 for managing a voice chat channel within a communication device 100 according to an embodiment of the invention. In this example, the user may select a voice chat channel on a communication device 100 at step 2605. Once in the channel, the user may then select a mode within the channel at decision block 2610. Selecting a channel mode may entail, for instance, toggling or pressing one of the side buttons 112, 113, 114 of communication device 100. A single button press may put communication device 100 into command mode for that channel. Once in command mode, using the main talk button 102 will cause communication device 100 to treat audio input as commands or instructions rather than voice message content. Alternatively, command mode may be invoked only while the predetermined command mode button remains pressed. All audio input received in this state may be treated as commands or instructions rather than voice message content. Once the channel mode has been selected for command mode, communication device 100 may be prepared to receive speech input in microphone 104 at step 2615. As described above, this may be after one of the buttons has been pressed and held. A speech command may then be received through microphone 104 at step 2620. For instance, the user may utter, "Play back the last three messages." Communication device 100 may then forward the audio to communication server 200 where it may be parsed and interpreted. Communication server 200 may then provide access to and instruct communication device 100 to play back the three most recent messages stored in the channel to which communication device 100 is in at step 2625. Communication device 100 may then output each of the messages as instructed. Following execution of the requested command in step 2625, communication device 100 may prompt the user whether to switch the channel mode at decision block 2630. Decision block 2630 may be implemented in multiple ways. For instance, voice message mode may be the default mode of a channel and the communication device 100 may automatically revert to voice message mode upon the completion of a command. If the user wishes to enter another command, she may have to re-engage command mode using the predetermined button as described earlier.

If command mode for the channel has not been engaged in decision block 2610, communication device 100 may remain in voice message mode and prepare for speech input at step 2635. When the main talk button 102 is held, any speech that follows may be treated as voice message content at step 2640. The received speech may begin streaming the received audio to communication server 200 even while the user is still speaking at step 2645. Communication device 100 may continue to stream the speech to communication server until the main talk button 102 is released to indicate the end of the voice message. The user may switch channel mode to command mode at decision block 2650 if so inclined by pressing and holding the predetermined button as described earlier.

Figure 27:
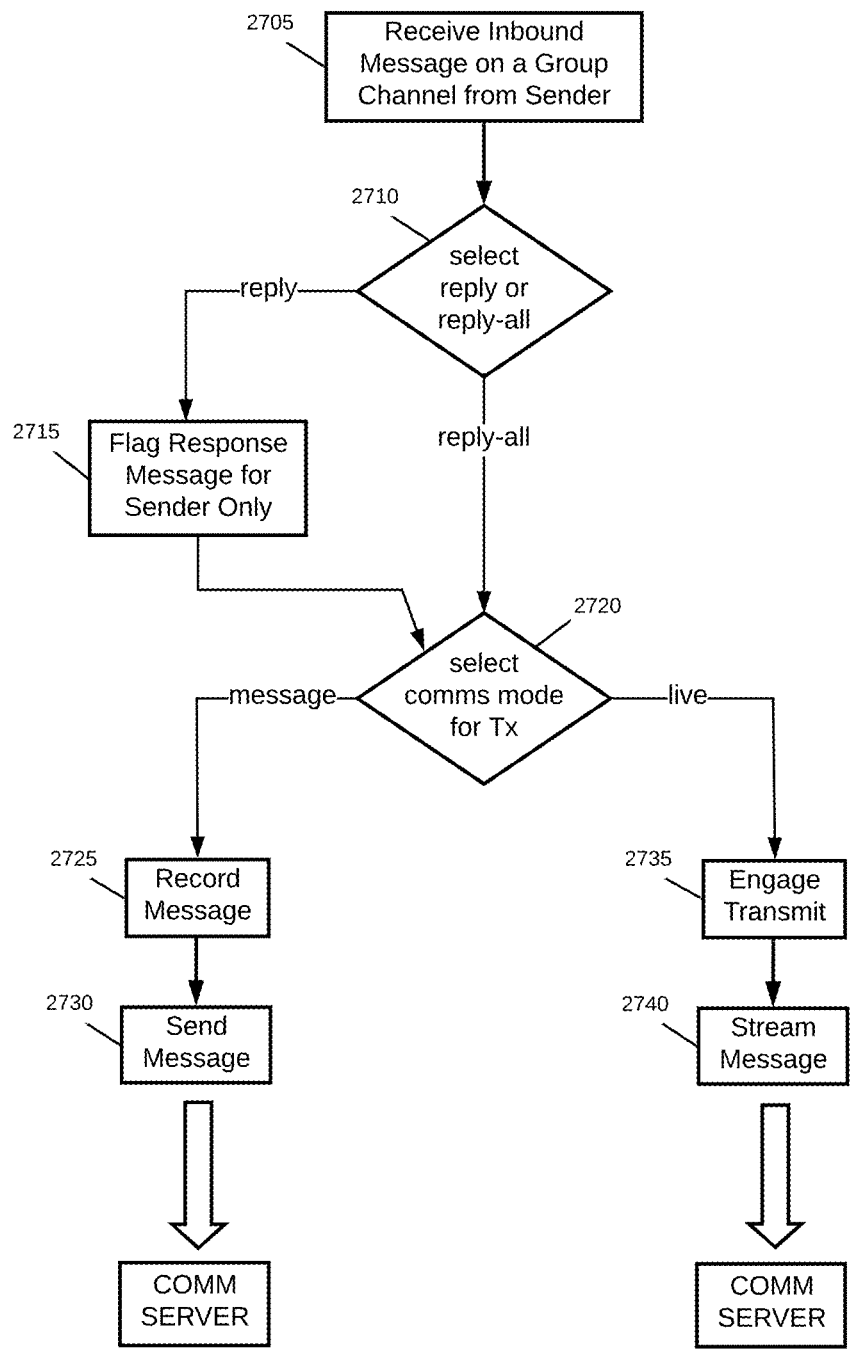
FIG. 27 is a logic flow diagram describing a process for managing a voice chat message received in a group channel according to an embodiment of the invention.

FIG. 27 is a logic flow diagram describing a process 2700 for managing a voice chat message received in a group channel according to an embodiment of the invention. In this example, the user may receive on a communication device 100 an inbound message on a group channel from a specific sender in step 2705. The user may wish to respond to the received message. The first decision in determining how to respond to the inbound message is to determine whether the response shall be send back to the entirety of the group (e.g., reply-all) or back to just the sender (e.g., reply) at decision block 2710. This decision may be effected by, for instance, utilizing a predetermined button for a reply-all versus a different predetermined button for a reply. Alternatively, the button used for initiating an outgoing message may be pressed once and held for a reply but pressed twice and held on the second press for a reply-all. Other means for distinguishing between a reply response and a reply-all response may be implemented as well based on the form factor and hardware of a communication device. In addition, some element of voice recognition activation may be used. For instance, upon receiving a group message, the first button press may be simply to receive a mode of reply instruction (e.g., "reply" or "reply-all"). Thereafter, normal outbound transmissions may be carried out according to the mode selected.

If "reply" is the selected mode of response, then any message response is flagged so that it will be sent back to the sender of the original message only at step 2715. The flag may simply be something like a message header. Once the response message is received into the communication server 200, it may then parse the response message to determine whether a reply to sender only flag is present. If so, communication server 200 may then ensure the response message is only returned to the original sender and not to the other users on the group channel.

Next, the user of the communication device may select a communication mode for the response to be transmitted at decision block 2720. In this embodiment, the user may respond with a live mode voice message or a message mode voice message. A live mode voice message is intended to be received and played immediately whereas a message mode voice message is intended to store the response on the recipients(s) communication device(s) for playback at a later time.

If the selected communication mode is message mode, the user may record a reply voice message at step 2725. The recorded voice message may then be sent at step 2730 to communication server 200 where it will be sent to and stored on the original sending communication device(s).

If the selected communication mode is live mode, the user may engage the transmit mode at step 2735. The recorded voice message may then be streamed at step 2740 to communication server 200 where it will be redirected to the original sending communication device and all other communication devices in the group channel.

Figure 28:
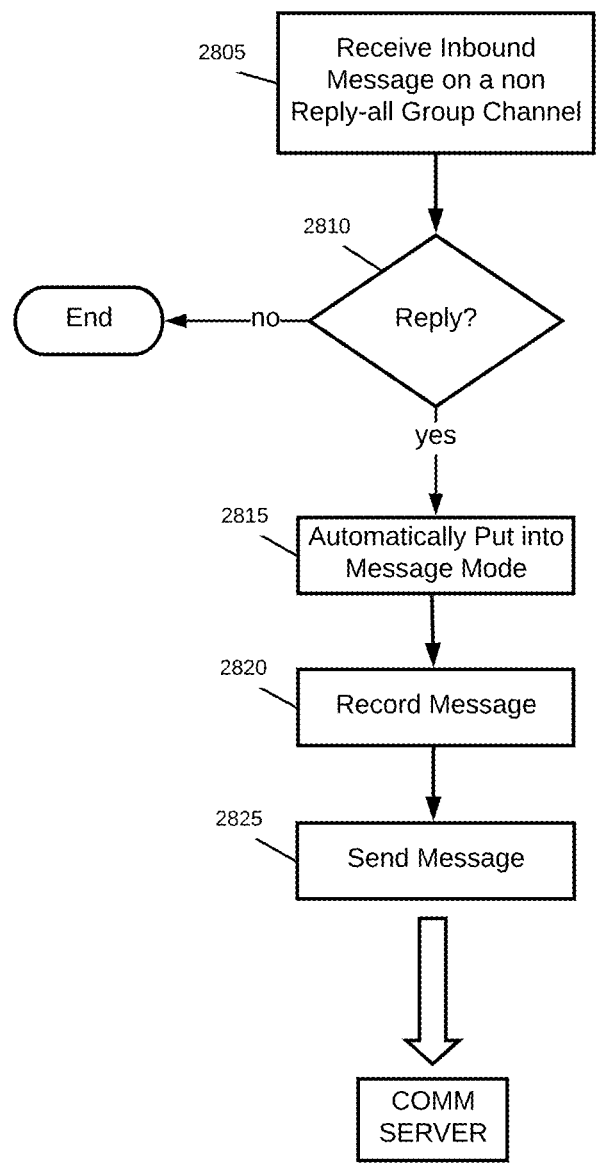
FIG. 28 is another logic flow diagram describing a process for managing a voice chat message in a group channel according to an embodiment of the invention.

FIG. 28 is another logic flow diagram describing a process for managing a voice chat message in a group channel according to an embodiment of the invention. In this example, the group channel may be pre-configured such that replies may only be made to the sender and replies may only be in message mode. This use case may be desired when a single user is soliciting responses from multiple other users but the responses need not be shared among or relevant to the other group members. Moreover, having the responses put into message mode prevents the original sender from receiving multiple live responses in quick succession. Message mode allows the original sender to peruse the responses and act accordingly. For example, the original sender may send a message out to her four person team asking, "Will anybody be near 4th and Main around 2:00 PM today?". Each team member may respond with their anticipated location which may be silently returned to the sender only in the message queue. The sender may then review the responses and contact one or more team members with further instructions.

In this embodiment, a user may receive an inbound message on a non reply-all group channel configured for message only responses at step 2805. The user then decides whether to reply to the inbound message at decision block 2810. If a reply is made, the communication mode is automatically placed into message mode at step 2815. This may entail flagging the message with a header to indicate message mode. The user may then record a message at step 2820 by, for instance, holding down the transmit button, speaking the message and releasing the transmit button. Upon release of the transmit button, the message may be sent at step 2825 to communication server 200 where it may be parsed to determine it is a message rather than a live response.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled,"

however, may also mean that two or more elements are not in direct contact with each other, but yet still co-operate or interact with each other.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. A method of responding to a pre-recorded inbound voice message in a communication system that includes communication devices and a communication server, the method comprising:
   in a first communication device:
      receiving a pre-recorded inbound voice message from a sender communication device via a communication server, the pre-recorded inbound voice message received over a group channel communication link managed by the communication sever and accessible to the sender communication device and multiple other recipient communication devices;
      setting a reply mode for a response voice message to the pre-recorded inbound voice message from a plurality of reply modes comprising a reply to all mode and a reply to sender mode;
      recording the response voice message to the pre-recorded inbound voice message;
      inserting a reply mode flag indicative of the reply mode into a message header for the response voice message;
      sending the response voice message to the communication server; and
   in the communication server:
      receiving the response voice message from the first communication device;
      determining the reply mode from the response voice message header;
      when the reply mode is reply to all, sending the response voice message to the sender communication device and other recipient communication devices over the group channel communication link; and
      when the reply mode is reply to sender, (i) establishing a direct channel communication link between the first communication device and the sender communication device; and (ii) sending the response voice message to the sender communication device over the direct channel communication link.

2. The method of claim 1, wherein setting a reply mode comprises:
   detecting a particular button activation comprising a first button activation for reply to all mode and a second button activation for reply to sender mode.

3. The method of claim 1, wherein setting a reply mode comprises:
   detecting a particular button activation sequence comprising a single tap and hold for reply to all mode and a double tap and hold for reply to sender mode.

4. The method of claim 1, wherein setting a reply mode comprises:
   detecting a voice command following a particular button activation, the voice command indicative of either reply to all mode or reply to sender mode.

5. The method of claim 1, wherein the first communication device is screenless.

6. A communication system configured to send and receive voice messages among a plurality of communication devices over one or more communication links managed by a communication server, comprising:
- a first communication device comprising one or more processors configured to execute instructions to:
  - receive a pre-recorded inbound voice message from a sender communication device via a communication server, the pre-recorded inbound voice message received over a group channel communication link managed by the communication sever and accessible to the sender communication device and multiple other recipient communication devices;
  - set a reply mode for a response voice message to the pre-recorded inbound voice message from a plurality of reply modes comprising a reply to all mode and a reply to sender mode;
  - record the response voice message to the pre-recorded inbound voice message;
  - insert a reply mode flag indicative of the reply mode into a message header for the response voice message;
  - send the response voice message to the communication server; and
- the communication server comprising one or more processors configured to execute instructions to:
  - receive the response voice message from the first communication device;
  - determine the reply mode from the response voice message header;
  - when the reply mode is reply to all, send the response voice message to the sender communication device and other recipient communication devices over the group channel communication link;
  - when the reply mode is reply to sender, (i) establish a direct channel communication link between the first communication device and the sender communication device; and (ii) send the response voice message to the sender communication device over the direct channel communication link.

7. The communication system of claim 6, the one or more processors of the first communication device configured to execute instructions to:
- detect a particular button activation comprising a first button activation for reply to all mode and a second button activation for reply to sender mode.

8. The communication system of claim 6, the one or more processors of the first communication device configured to execute instructions to:
- detect a particular button activation sequence comprising a single tap and hold for reply to all mode and a double tap and hold for reply to sender mode.

9. The communication system of claim 6, the one or more processors of the first communication device configured to execute instructions to:
- detect a voice command following a particular button activation, the voice command indicative of either reply to all mode or reply to sender mode.

10. The communication system of claim 6, wherein the first communication device is screenless.

11. A non-transitory computer-readable medium comprising a plurality of instructions that when executed enable processing circuitry to send and receive voice messages among a plurality communication devices over one or more communication links managed by a communication server, the instructions to:
- receive a pre-recorded inbound voice message into a first communication device from a sender communication device via a communication server, the pre-recorded inbound voice message received over a group channel communication link managed by the communication sever and accessible to the sender communication device and multiple other recipient communication devices;
- set a reply mode for a response voice message to the pre-recorded inbound voice message from a plurality of reply modes comprising a reply to all mode and a reply to sender mode;
- record the response voice message to the pre-recorded inbound voice message;
- insert a reply mode flag indicative of the reply mode into a message header for the response voice message;
- send the response voice message to the communication server;
- receive the response voice message from the first communication device;
- determine the reply mode from the response voice message header;
- when the reply mode is reply to all, send the response voice message to the sender communication device and other recipient communication devices over the group channel communication link;
- when the reply mode is reply to sender, (i) establish a direct channel communication link between the first communication device and the sender communication device; and (ii) send the response voice message to the sender communication device over the direct channel communication link.

12. The non-transitory computer-readable medium of claim 11, further comprising a plurality of instructions that when executed enable processing circuitry to:
- detect a particular button activation comprising a first button activation for reply to all mode and a second button activation for reply to sender mode.

13. The non-transitory computer-readable medium of claim 11, further comprising a plurality of instructions that when executed enable processing circuitry to:
- detect a particular button activation sequence comprising a single tap and hold for reply to all mode and a double tap and hold for reply to sender mode.

14. The non-transitory computer-readable medium of claim 11, further comprising a plurality of instructions that when executed enable processing circuitry to:
- detect a voice command following a particular button activation, the voice command indicative of either reply to all mode or reply to sender mode.

15. The non-transitory computer-readable medium of claim 11, wherein the first communication device is screenless.

* * * * *